US010612300B2

(12) United States Patent
Chen et al.

(10) Patent No.: US 10,612,300 B2
(45) Date of Patent: Apr. 7, 2020

(54) WINDOW BLIND

(71) Applicant: NIEN MADE ENTERPRISE CO., LTD., Taichung (TW)

(72) Inventors: Lin Chen, Taichung (CN); Keng-Hao Nien, Taichung (TW)

(73) Assignee: Nien Made Enterprise Co., Ltd., Taichung (TW)

(*) Notice: Subject to any disclaimer, the term of this patent is extended or adjusted under 35 U.S.C. 154(b) by 402 days.

(21) Appl. No.: 15/417,100

(22) Filed: Jan. 26, 2017

(65) Prior Publication Data
US 2017/0218697 A1    Aug. 3, 2017

Related U.S. Application Data

(60) Provisional application No. 62/318,771, filed on Apr. 6, 2016, provisional application No. 62/326,020, filed on Apr. 22, 2016.

(30) Foreign Application Priority Data

Jan. 29, 2016  (CN) .................... 2016 2 0093383 U

(51) Int. Cl.
*E06B 9/304* (2006.01)
*E06B 9/322* (2006.01)
(Continued)

(52) U.S. Cl.
CPC .............. *E06B 9/322* (2013.01); *E06B 9/304* (2013.01); *E06B 9/307* (2013.01); *E06B 9/34* (2013.01); *F16H 19/06* (2013.01); *F16H 29/12* (2013.01); *E06B 9/388* (2013.01); *E06B 2009/807* (2013.01)

(58) Field of Classification Search
CPC ................. E06B 2009/785; E06B 9/80; E06B 2009/807; E06B 9/32; E06B 2009/285; E06B 9/38; E06B 9/304; E06B 9/307; E06B 9/322; E06B 9/303; E06B 9/78
See application file for complete search history.

(56) References Cited

U.S. PATENT DOCUMENTS 2,738,005 A   3/1956   Nisenson
4,681,279 A   7/1987   Nakamura
(Continued)

FOREIGN PATENT DOCUMENTS

AU          782302 B2      7/2005
AU     2012370499 A1       9/2014
(Continued)

*Primary Examiner* — Katherine W Mitchell
*Assistant Examiner* — Jeremy C Ramsey
(74) *Attorney, Agent, or Firm* — Muncy, Geissler, Olds & Lowe, P.C.

(57) ABSTRACT

A window blind includes a fixed rail and a plurality of slats hang below the fixed rail through a ladder tape. The slats are controlled by an output adjustment mechanism to change between a first state and a second state. In addition, an output clutch mechanism is provided to collect or to expand the window blind. Said output adjustment mechanism and said output clutch mechanism are both controlled by an input mechanism. Whereby, it requires only one single control module to adjust shielding of the slat assembly composed of the slats, and to expand or collect the slat assembly.

20 Claims, 31 Drawing Sheets

(51) Int. Cl.
  *E06B 9/34* (2006.01)
  *F16H 19/06* (2006.01)
  *F16H 29/12* (2006.01)
  *E06B 9/307* (2006.01)
  *E06B 9/388* (2006.01)
  *E06B 9/80* (2006.01)

(56) References Cited

U.S. PATENT DOCUMENTS

| | | | |
|---|---|---|---|
| 5,123,472 A | 6/1992 | Nagashima et al. | |
| 6,129,131 A | 10/2000 | Colson | |
| 6,155,328 A | 12/2000 | Welfonder | |
| 6,332,491 B1 | 12/2001 | Rossini | |
| 6,715,528 B2 | 4/2004 | Rossini | |
| 6,786,270 B2* | 9/2004 | Wen | E06B 9/322 160/170 |
| 6,948,544 B2 | 9/2005 | Nien | |
| 6,955,207 B2 | 10/2005 | Minder | |
| 7,198,089 B2 | 4/2007 | Hsu | |
| 7,341,091 B2 | 3/2008 | Nien et al. | |
| 7,353,856 B2* | 4/2008 | Pon | E06B 9/34 160/120 |
| 7,406,995 B2 | 8/2008 | Huang | |
| 7,578,334 B2 | 8/2009 | Smith et al. | |
| 7,717,154 B2 | 5/2010 | Cheng | |
| 8,230,896 B2* | 7/2012 | Anderson | E06B 9/262 160/170 |
| 8,267,145 B2 | 9/2012 | Fraser et al. | |
| 9,062,492 B2 | 6/2015 | Yu et al. | |
| 9,127,500 B2 | 9/2015 | Huang | |
| 9,151,109 B2* | 10/2015 | Kawai | E06B 9/262 |
| 9,284,774 B2 | 3/2016 | Yu et al. | |
| 9,580,958 B2* | 2/2017 | Zhang | E06B 9/308 |
| 2009/0120592 A1 | 5/2009 | Lesperance | |
| 2011/0290429 A1 | 12/2011 | Cheng | |
| 2012/0125543 A1 | 5/2012 | Chambers | |
| 2013/0087415 A1 | 4/2013 | Hsieh | |
| 2013/0340951 A1* | 12/2013 | Yu | E06B 9/322 160/168.1 P |
| 2014/0131502 A1 | 5/2014 | Zhu | |
| 2015/0211296 A1 | 7/2015 | Zhang et al. | |
| 2015/0354275 A1 | 12/2015 | Huang et al. | |
| 2015/0368968 A1 | 12/2015 | Smith | |

FOREIGN PATENT DOCUMENTS

| | | |
|---|---|---|
| CA | 2805798 A1 | 8/2014 |
| CN | 101021139 B | 7/2010 |
| CN | 102369334 A | 3/2012 |
| JP | 1993018168 A | 1/1993 |
| JP | H07324572 A | 12/1995 |
| JP | 2000145328 | 5/2000 |
| JP | 2000220369 | 8/2000 |
| JP | 2001271576 A | 10/2001 |
| JP | 3261106 | 2/2002 |
| JP | 3378813 | 2/2003 |
| JP | 3442670 | 9/2003 |
| JP | 3485164 | 1/2004 |
| JP | 2008013950 | 1/2008 |
| JP | 4074420 | 4/2008 |
| JP | 2013072183 | 4/2013 |
| JP | 2013072224 | 4/2013 |
| JP | 2014066117 A | 4/2014 |
| TW | I246415 | 1/2006 |
| TW | I4863961 | 12/2014 |
| WO | WO 2010125951 | 11/2010 |
| WO | 2012031716 A2 | 3/2012 |

\* cited by examiner

WINDOW BLIND

BACKGROUND OF THE INVENTION

1. Technical Field

The present invention relates generally to a covering structure for buildings, and more particularly to a window blind which uses one single control module to collect or expand the covering material composed of slats or pieces of fabric.

2. Description of Related Art

By raising and lowering the covering material of a conventional window covering, the area to be shielded can be determined. The window coverings can be roughly divided into window blinds, cellular shades, roller shades, and sheer shades by the types or appearances of the covering materials. Among these classifications, a window blind generally has a covering material composed of a plurality of horizontally arranged shielding members, wherein the shielding members can be long slats or pieces of fabric which can be rolled up through a reel. The window blind using pieces of fabric as its covering material is also called a window roller blind.

Window coverings can be also divided into two types by either a cord is used or not. Each type has its own way of operation. The power of a cordless window covering can be provided by a spring or an electric source, wherein the covering material can be operated manually, or the state of the covering material can be changed through a human-machine interaction (HMI). On the other hand, window coverings having a cord can be further divided into two types: one uses a cord, and the other one uses a cord loop. A window covering using a cord has one single cord, and an end of the single cord is connected to the bottommost edge of the covering material, while another end thereof is exposed out after passing through the headrail of the window covering to be operated, so that the area shielded by the covering material can be adjusted by pulling the exposed cord. As for a window covering using a cord loop, a rotatable shaft tube or shaft is usually provided in the headrail, wherein the shaft tube or the shaft can be rotated as being driven by an exposed cord loop. By pulling the front or the rear sides of the cord loop, the covering material can be rolled up or expanded correspondingly.

However, no matter the covering material of a window blind is composed of a plurality of slats or pieces of fabric, and no matter how the covering material is operated, another adjusting mechanism is still required to adjust the inclination angle of each of the slats or to change the state (i.e., being rolled up or expanded) of each piece of fabric. In other words, a window covering has two separated mechanisms, one is for expanding or collecting the covering material, and the other one is for rolling up or expanding the pieces of fabric. Such design is inconvenient for operation.

BRIEF SUMMARY OF THE INVENTION

In view of the above, the primary objective of the present disclosure is to provide a window blind, which is easy to install and easy to use.

The present disclosure provides a window blind, which includes a fixed rail, a plurality of slats, an input mechanism, an output adjustment mechanism, a first shaft, and a second shaft. The slats are horizontally hanged below the fixed rail through at least one ladder tape, each of which has a front tape body and a rear tape body. The input mechanism is adapted to control at least one lifting cord, so as to raise or lower the slats to collect or expand the window blind. The output adjustment mechanism is provided in the fixed rail, wherein the output adjustment mechanism is operated with the input mechanism simultaneously. The first shaft is provided in the fixed rail, wherein an end of the first shaft is connected to the output adjustment mechanism. The output adjustment mechanism is adapted to be driven by the input mechanism to rotate the first shaft, whereby to relative move the front tape body and the rear tape body of the ladder tape in a vertical direction, changing the slats between a first state and a second state. The second shaft is provided in the fixed rail, wherein, when the second shaft is driven by the input mechanism to roll up the lifting cord to move a lowest slat among the slats toward the fixed rail, the slats are in the first state; when the second shaft is driven by the input mechanism to release the at least one lifting cord to move the lowest slat among the slats away from the fixed rail, the slats are in the second state.

With the aforementioned design of the present disclosure, it would require only one single control module to expand and collect the covering material and to roll up and expand the pieces of fabric.

BRIEF DESCRIPTION OF THE SEVERAL VIEWS OF THE DRAWINGS

The present disclosure will be best understood by referring to the following detailed description of some illustrative embodiments in conjunction with the accompanying drawings, in which.

DETAILED DESCRIPTION OF THE INVENTION

Figure 1:
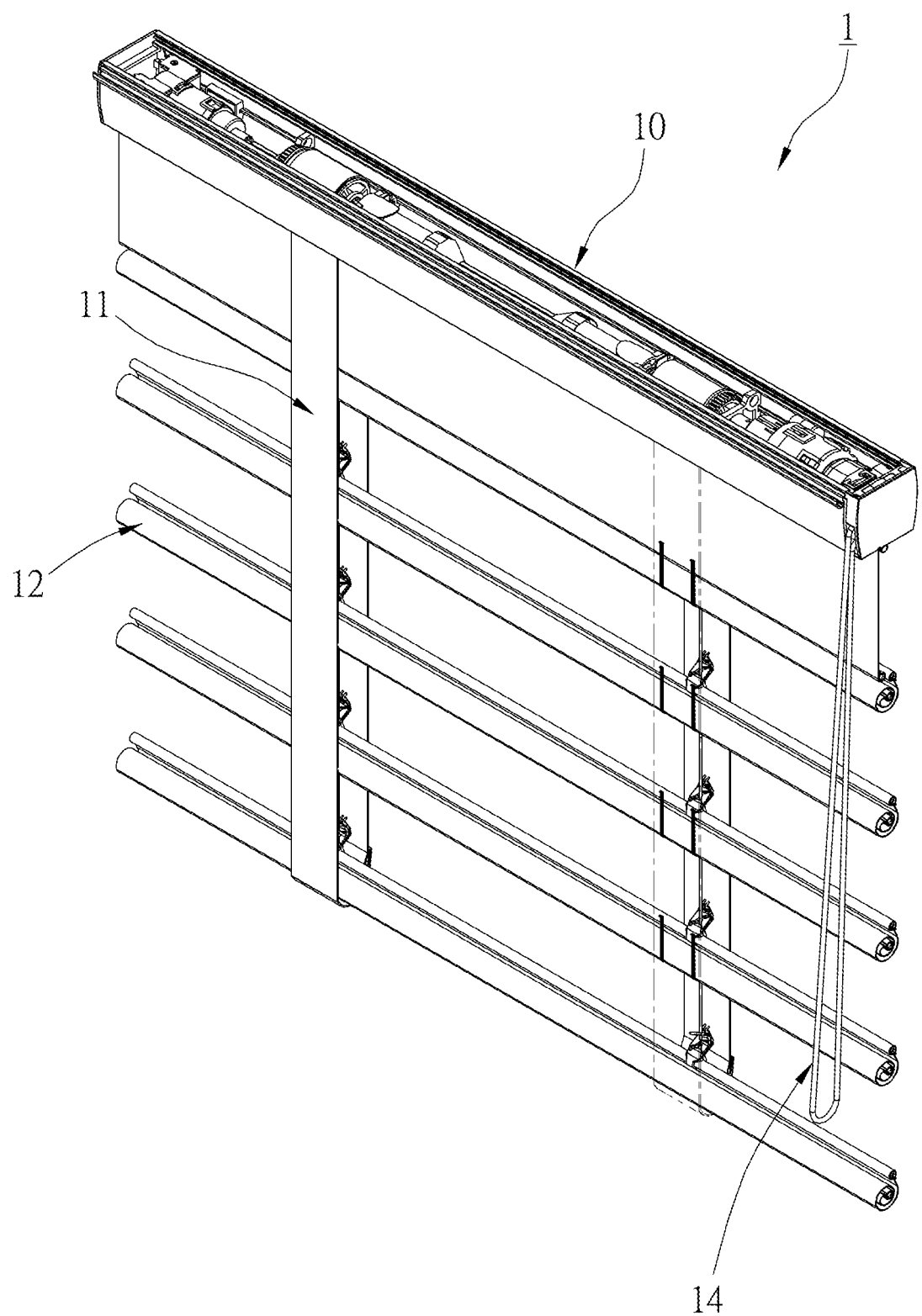
FIG. 1 is a perspective view of a window blind of the embodiment of the present disclosure, showing the window blind is expanded, and the pieces of fabric are rolled up.
Figure 2:
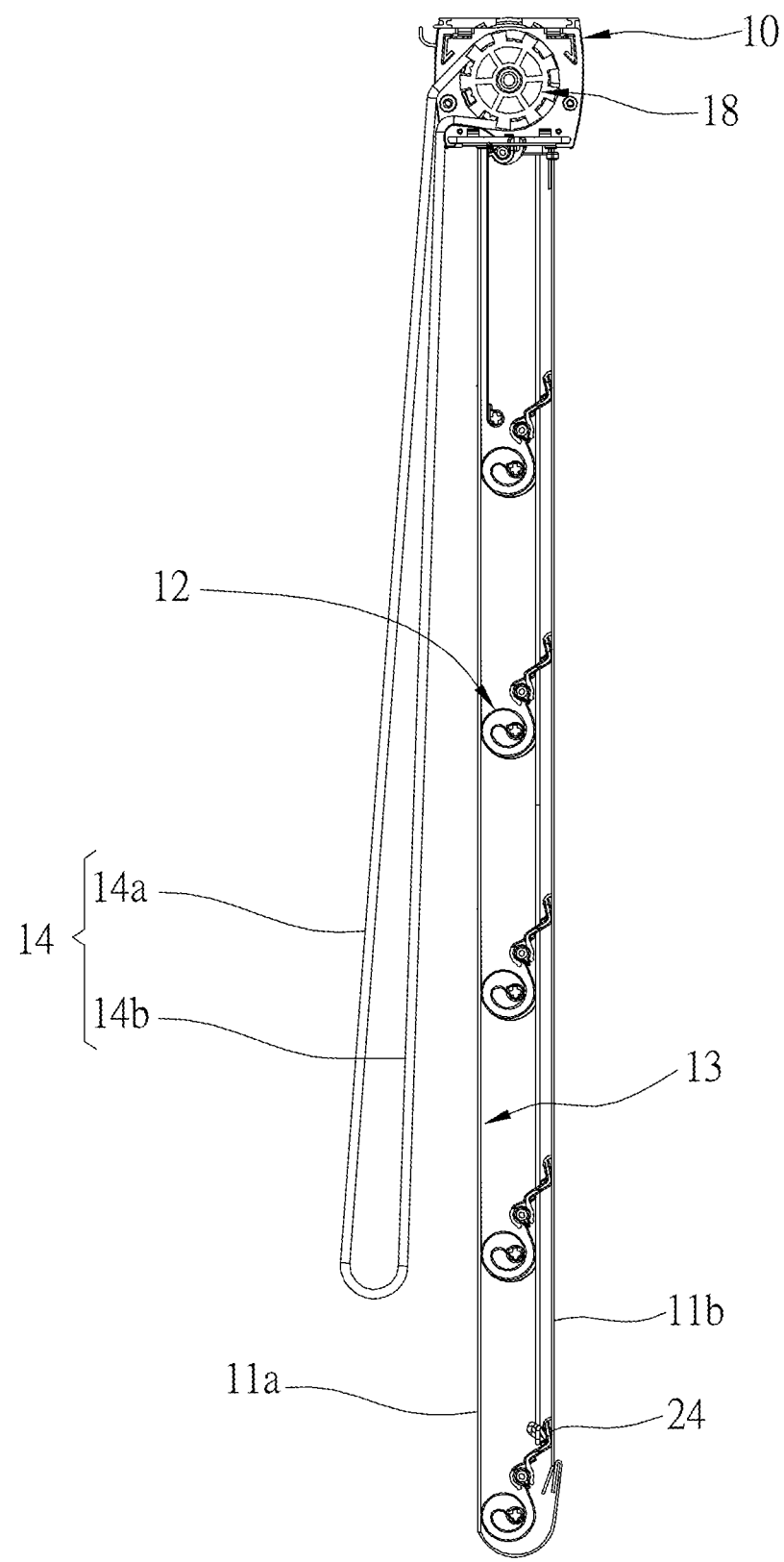
FIG. 2 is a side view of FIG. 1.
Figure 3:
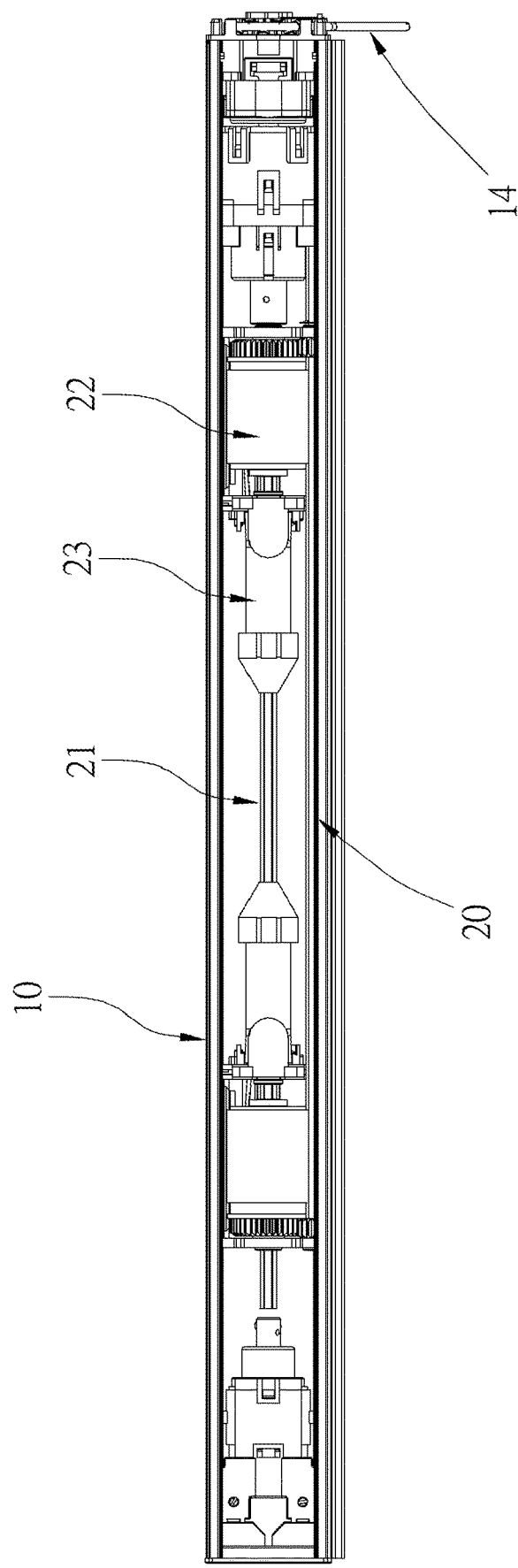
FIG. 3 is a top view of FIG. 1.

As shown in FIG. 1 to FIG. 3, a window blind 1 of an embodiment of the present disclosure includes a fixed rail 10, a plurality of ladder tapes 11, a plurality of slats, which are long pieces of fabric 12 made of a flexible material as an example, a plurality of lifting cords 13, and a cord loop 14. The fixed rail 10 is fixed on a structure of a building, and the pieces of fabric 12 are hanged below the fixed rail 10 through the ladder tapes 11, wherein the pieces of fabric 12 constitute a covering material which provides the effect of shielding.

Figure 4:
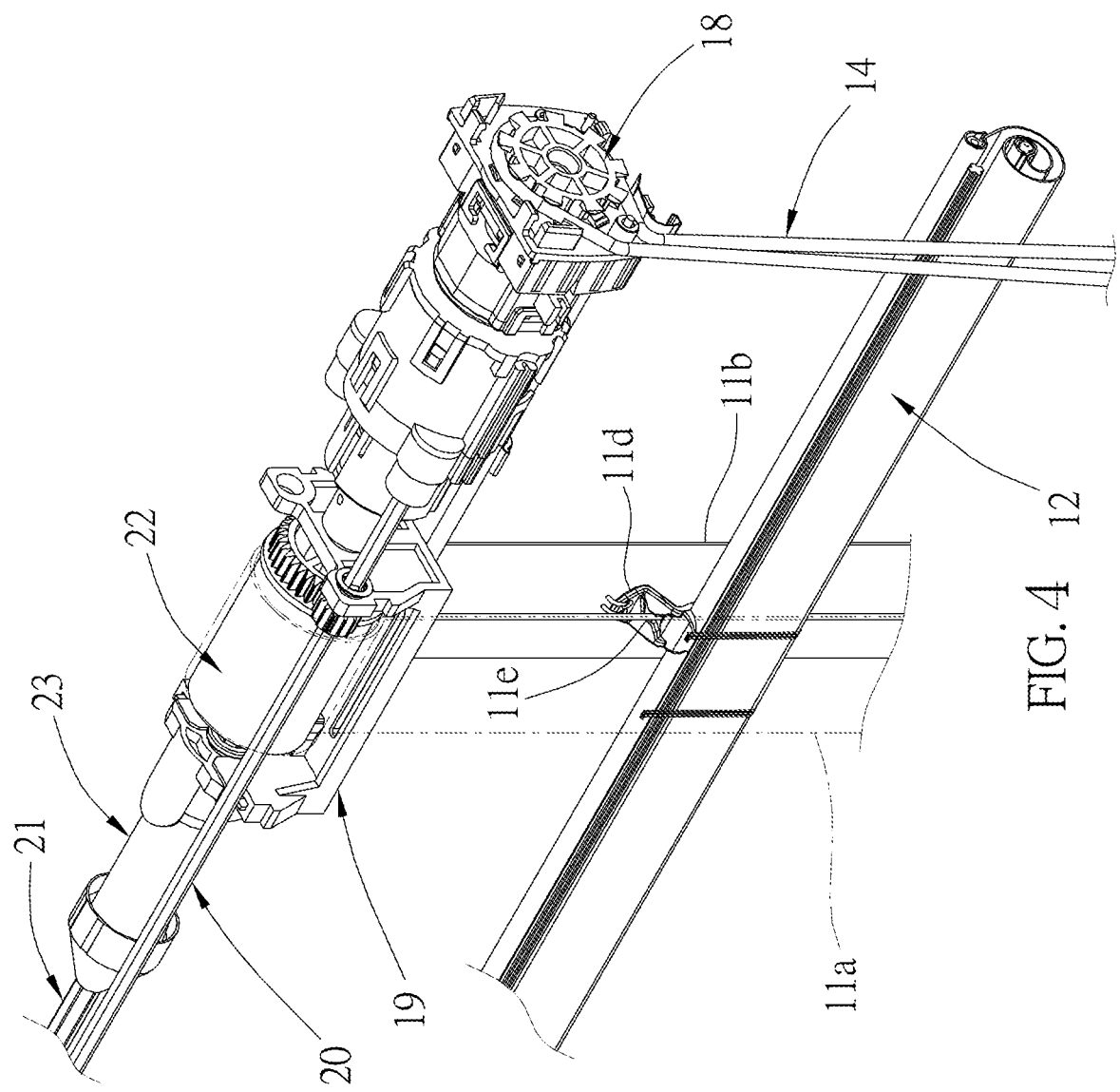
FIG. 4 is a perspective view, showing part of the components of the window blind in the embodiment of the present disclosure.
Figure 5:
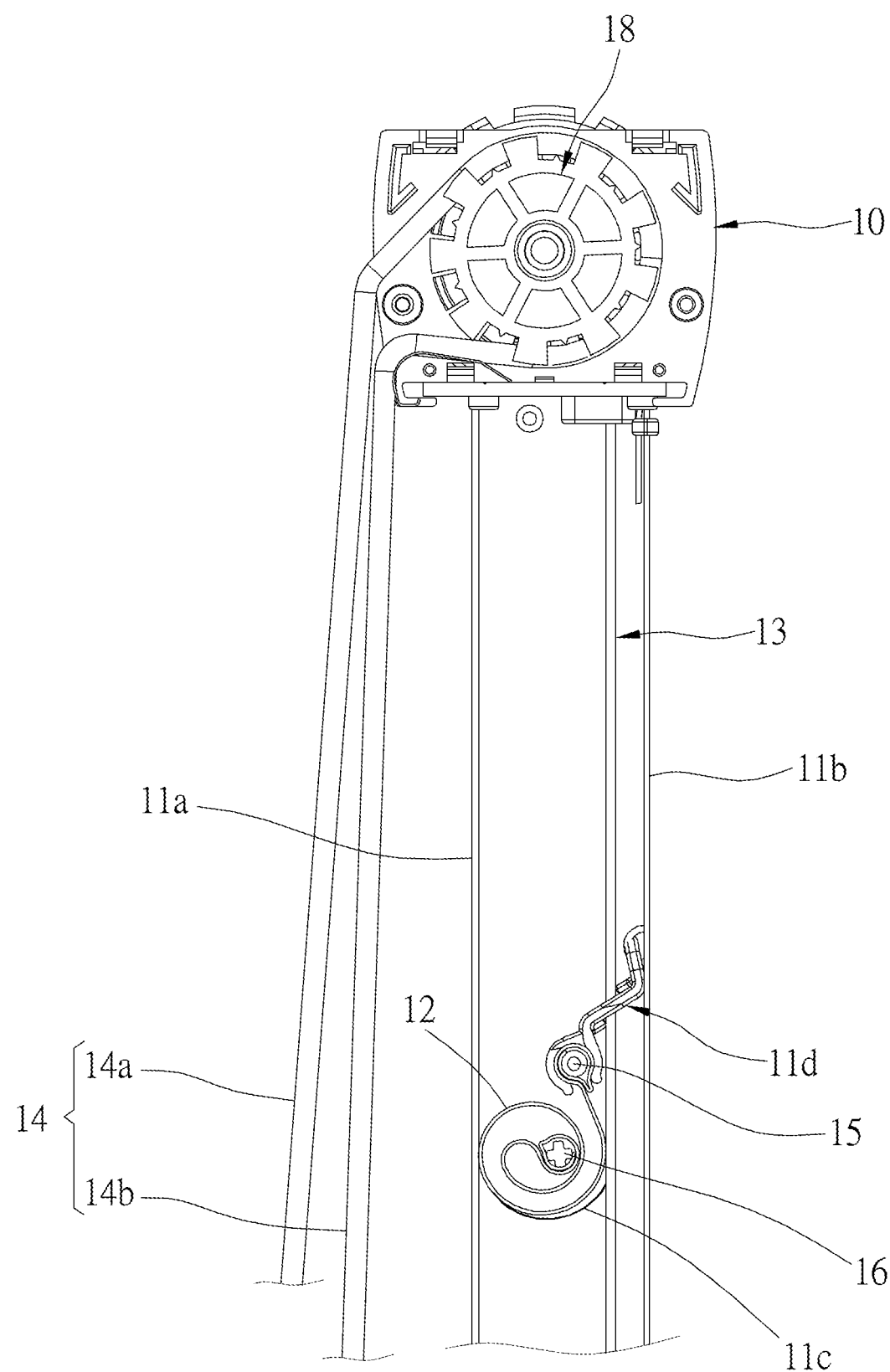
FIG. 5 is a side view of FIG. 4.

As illustrated in FIG. 4 and FIG. 5, each of the ladder tapes 11 includes a front tape body 11a and a rear tape body 11b which both hang down. A plurality of wefts 11c are connected between the front tape body 11a and the rear tape body 11b in a vertical manner, wherein the rear tape body 11b further has a plurality of clips 11d sewn thereon, the clips 11d is located above where each of the wefts 11c is connected to the rear tape body 11b. Each of the clips 11d has a through hole 11e. Each of the pieces of fabric 12 is a piece of long rectangular woven cloth, wherein each of two long edges of each of the pieces of fabric 12 has a thin rod sewn thereon, respectively. The thin rod 15 located above is adapted to be engaged with one of the clips 11d, while the thin rod 16 located below provides a counterweight effect, which would make the corresponding piece of fabric 12 naturally droop and expand when not rolled up. Each of the pieces of fabric 12 is located on one of the wefts 11c and between the front tape body 11a and the rear tape body 11b. When the covering material is collected, the pieces of fabric 12 are supported by the wefts 11c. In the current embodiment, the number of the lifting cords 13 equals the number of the ladder tapes 11, wherein each of the lifting cords 13 passes through the through holes 11e of one column of the clips 11d, so as to be located near the rear tape body 11b of the corresponding ladder tape 11. The lifting cords 13 are adapted to be reeled to collect the covering material, or to be released to expand the covering material.

The window blind 1 further includes an input mechanism, an output adjustment mechanism, an output clutch mechanism, and a stroke delay mechanism. In the current embodiment, the operation is performed with a cord loop. However, this is merely an example, and is not a limitation of the present disclosure. The input mechanism includes the cord loop 14, which can be defined to have a front side cord 14a and a rear side cord 14b, wherein the cord loop 14 fits around a rotatable transmission member provided in the fixed rail 10. In the current embodiment, said transmission member is a rotating wheel 18. By pulling the front side cord 14a or the rear side cord 14b, the rotating wheel 18 can be rotated in opposite directions. The fixed rail 10 is provided with two seats 19 therein, wherein a first shaft 20 and a second shaft 21 respectively pass through the seats 19. The first shaft 20 and the second shaft 21 are long shafts which are adapted to be rotated, and are arranged in parallel, wherein a cross section of each of the first shaft 20 and the second shaft 21 is non-circular.

Figure 6:
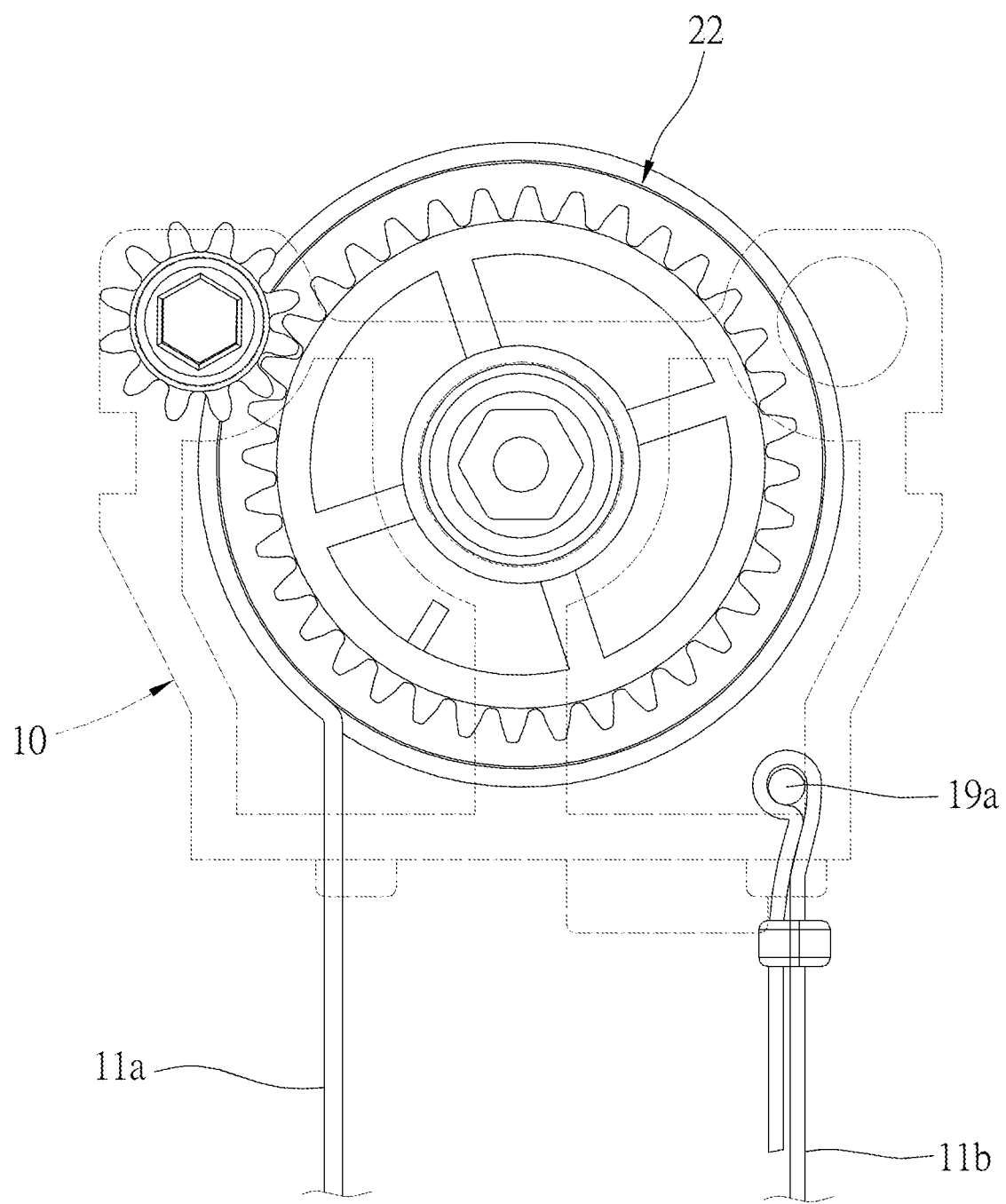
FIG. 6 is a perspective view, showing the connection location of the ladder tape.
Figure 7:
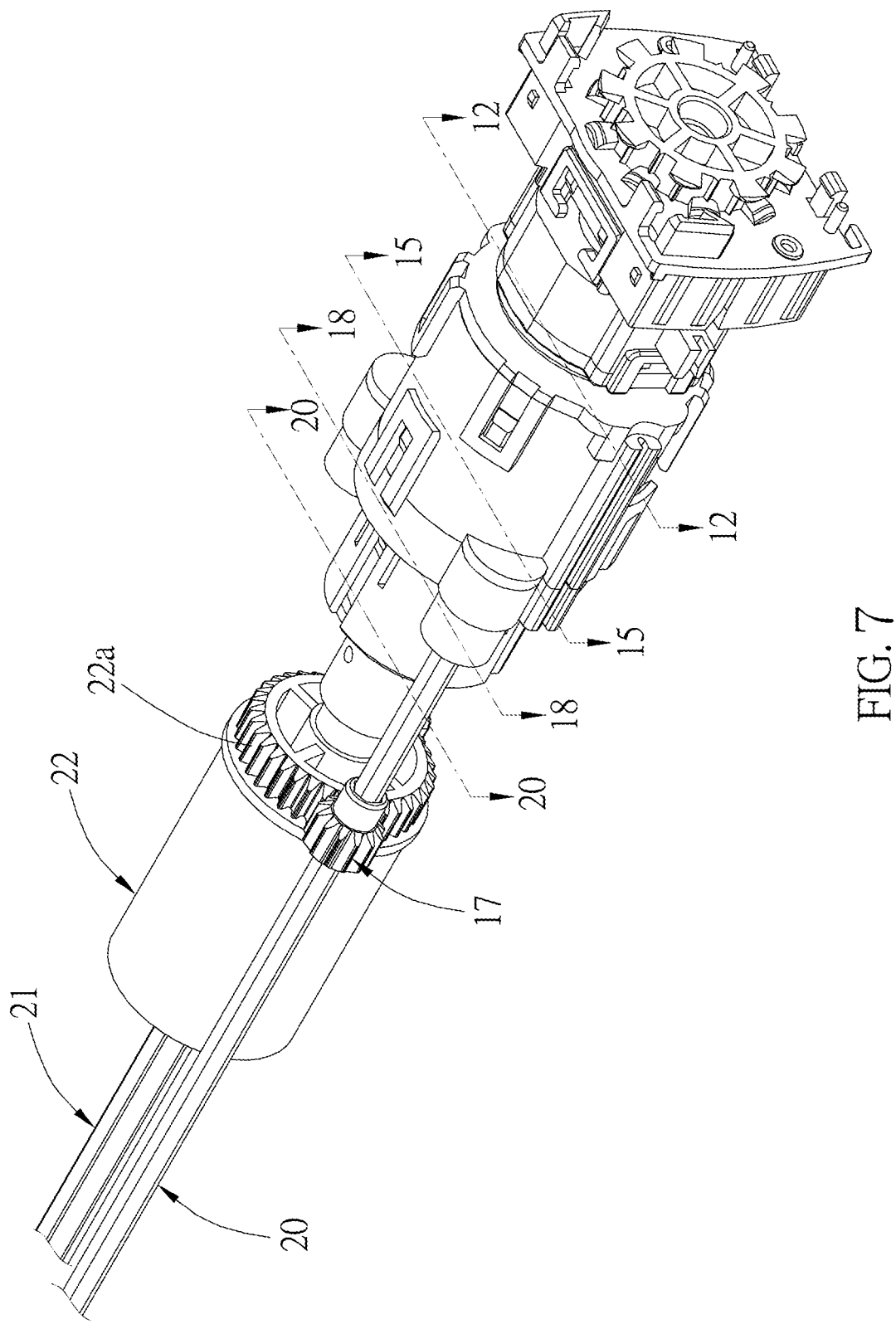
FIG. 7 is a partial enlarged perspective view, showing part of the components which are used to control the window blind.

As shown in FIG. 3 and FIG. 4, a first spool 22 and a second spool 23 fit around the second shaft 21 on each side thereof, wherein each of the first spools 22 is provided in one of the seats 19, and has a round hole passed through by the second shaft 21. The first spools 22 do not rotate along with the second shaft 21. Each of the second spools 23 has a non-circular hole, which is passed through by the second shaft 21, and the second spools 23 would rotate along with the second shaft 21. As shown in FIG. 2 and FIG. 6, a top end of the front tape body 11a of each of the ladder tapes 11 is fixedly connected to one of the first spools 22, and a bottom end thereof is fixedly connected to a counterweight rod 24. A top end of the rear tape body 11b of each of the ladder tapes 11 is fixedly connected to a shaft 19a in one of the seats 19, so that each of the ladder tapes 11 is supported by the corresponding shaft 19a, and a bottom end thereof is also fixedly connected to the counterweight rod 24. In other embodiments, the top end of the rear tape body 11b of each of the ladder tapes 11 can be directly connected to the fixed rail 10 to be supported thereby, or, similar to the front tape body 11a, fixedly connected to one of the first spools 22 so that each of the ladder tapes 11 can be driven by the corresponding first spool 22. A top end of each of the lifting cords 13 is fixedly connected to one of the second spools 23, and a bottom end thereof is fixedly connected to the counterweight rod 24. Therefore, the rotation of the first spools 22 could roll up or release the front tape body 11a of the ladder tapes 11, and the rotation of the second spools 23 could roll up or release the lifting cords 13. In addition, as shown in FIG. 7, an outer toothed ring 22a is provided on a side of each of the first spools 22, and two gears 17 are provided to fit around the first shaft 20 in a manner that the gears 17 are not rotatable relative to the first shaft 20, wherein each of the gears 17 meshes with the outer toothed ring 22a of one of the first spools 22.

In the current embodiment, the output adjustment mechanism further includes a first case. As shown in FIG. 8 to FIG. 11, said first case in the current embodiment is composed of a front tube 32, a middle tube 33, a rear tube 34, and an end cap 35, wherein the front tube 32 and the end cap 35 are respectively connected to two opposite ends of the middle tube 33 by snap-fitting. The rear tithe 34 is provided inside the middle tube 33 in a non-rotatable manner. The rear tube 34 has a stopper 34a projected from an inner wall of the rear tube 34. The end cap 35 has a through hole 35a passed through by a second coupling post 29a of an intermediate plate 29. The output adjustment mechanism includes an adjustment output wheel 36, a first brake spring 37, a transmission wheel 38, an adjustment clutch wheel 39, an adjustment clutch spring 40, and an adjustment driven wheel 41, which are all installed between said front tube 32 and said rear tube 34.

As shown in FIG. 8 to FIG. 11, the rotating wheel 18 of the input mechanism includes a wheel portion 181 and an axle portion 182 which are detachably engaged with each other. The cord loop 14 goes around the wheel portion 181. The wheel portion 181 has a protrusion 181a provided on a side thereof, and the axle portion 182 has an axial bore 182a which is passed through by the protrusion 181a, wherein the protrusion 181a could rotate the axle portion 182 in the same direction as the wheel portion 181 rotating. The axle portion 182 has a non-circular first coupling post 182b provided on another side thereof. However, the wheel portion and the axle portion could be two inseparable components, or could be integrally made in practice. In addition, the input mechanism in the current embodiment further includes a second case and a deceleration unit, wherein the second case is formed by coupling a fixing tube 25 and a side cap 26. The deceleration unit is located between the fixing tube 25 and the side cap 26, and has an input end and an output end, whereby a force generated by the input mechanism could be transmitted to the output clutch mechanism through the deceleration unit.

Figure 12:
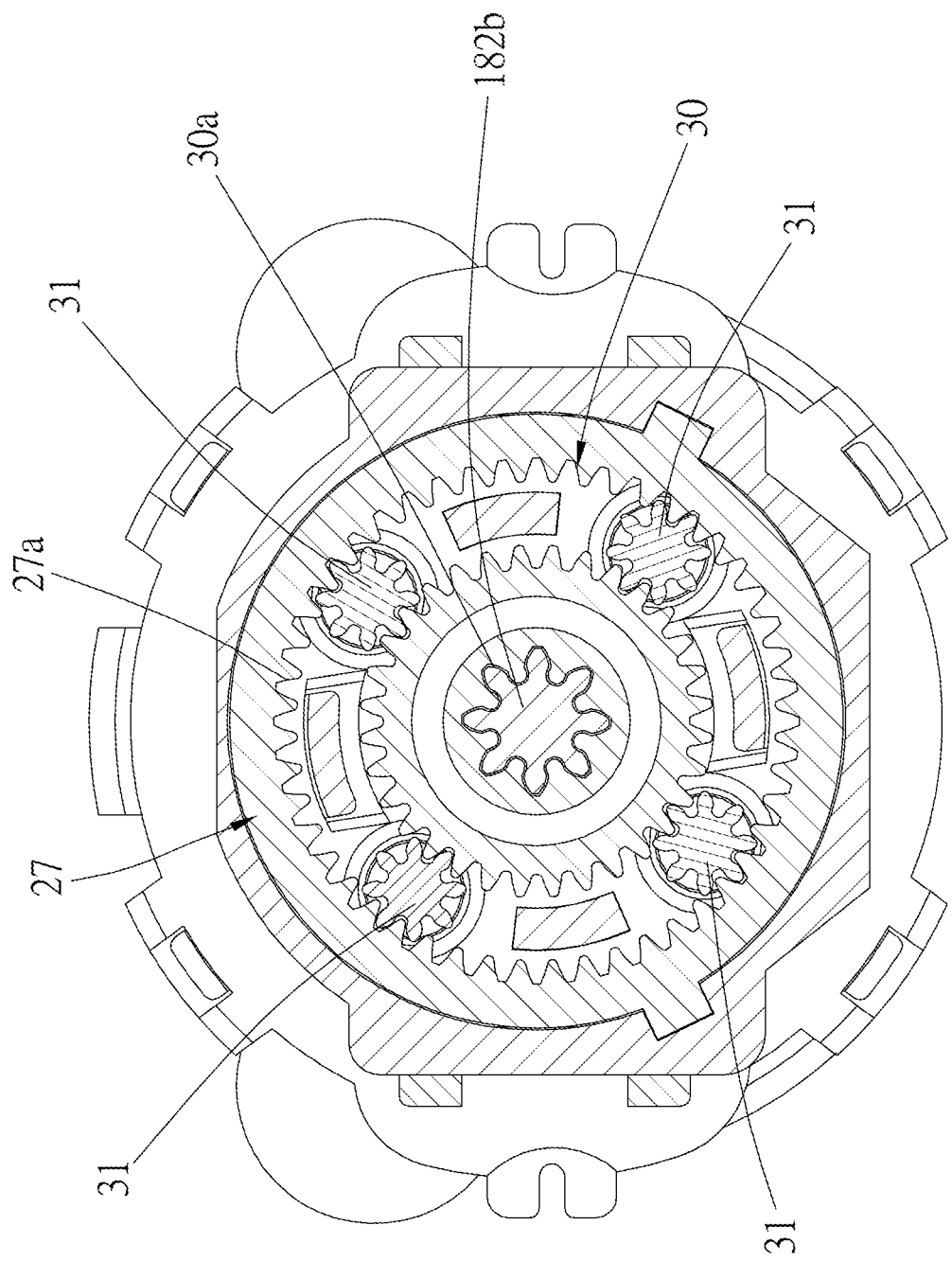
FIG. 12 is a sectional view along the 12-12 line in FIG. 7.

In the current embodiment, the deceleration unit includes a fixed ring 27, an intermediate plate 28, the intermediate plate 29, a center gear 30, and a plurality of edge gears 31. The fixed ring 27 is fixed (i.e., not movable), and has a toothed ring 27a provided on an inner wall of the fixed ring 27. The intermediate plates 28, 29 are respectively located on two sides of the fixed ring 27, so as to retain the center gear 30 and the edge gears 31 inside the fixed ring 27. The second coupling post 29a is non-circular, and is provided at a center of an outer surface of the intermediate plate 29, wherein the second coupling post 29a passes through a through hole 26a of the side cap 26. As shown in FIG. 12, a center of the center gear 30 is provided with a second coupling hole 30a, which is passed through by the first coupling post 182b, so that the center gear 30 could be rotated along with the first coupling post 182b. The edge gears 31 are disposed around a periphery of the center gear 30, each of the edge gears 31 has a part meshing with the center gear 30, while another part thereof meshes with the toothed ring 27a. Furthermore, each of the edge gears 31 has a central axis 31a, wherein two ends of the central axis 31a are respectively connected to one of the intermediate plates 28, 29. Whereby, when the center gear 30 is rotated, each of the edge gears 31 would be rotated along the toothed ring 27a due to the fixed ring 27 is stationary. As a result, the intermediate plates 28, 29 are rotated as well. Said center gear 30 and the edge gears 31 constitute an assembly of planet gears, whereby to lower the transmission pace from the rotating wheel 18 to the adjustment clutch wheel 39. Further, the assembly of planet gears could provide the effect of deceleration and effort saving. The second coupling hole 30a constitutes said input end, and is connected to the rotating wheel 18. The second coupling post 29a constitutes said output end.

Figure 13:
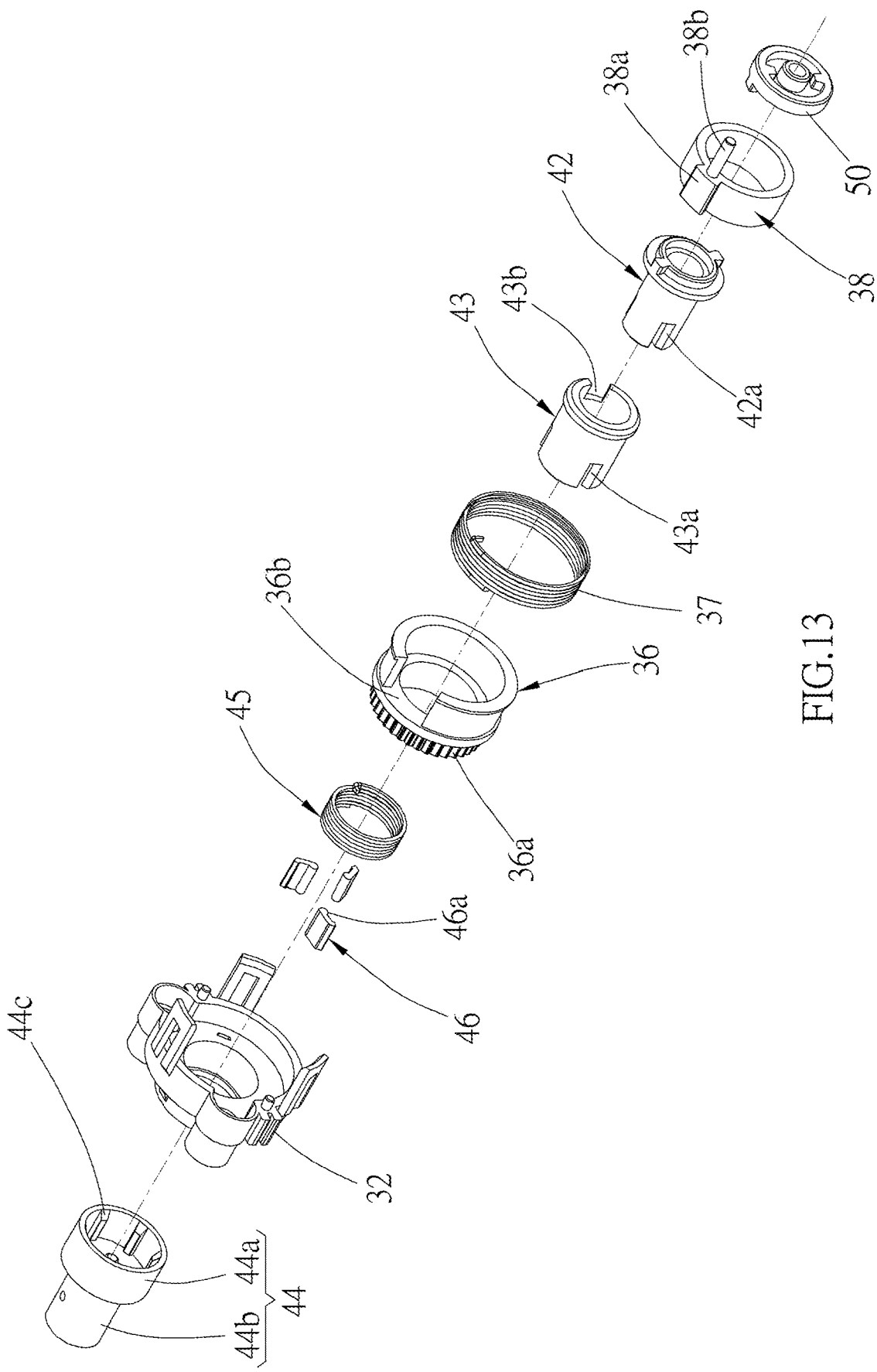
FIG. 13 and FIG. 14 are exploded perspective views of the output clutch mechanism used to control the window blind.
Figure 14:
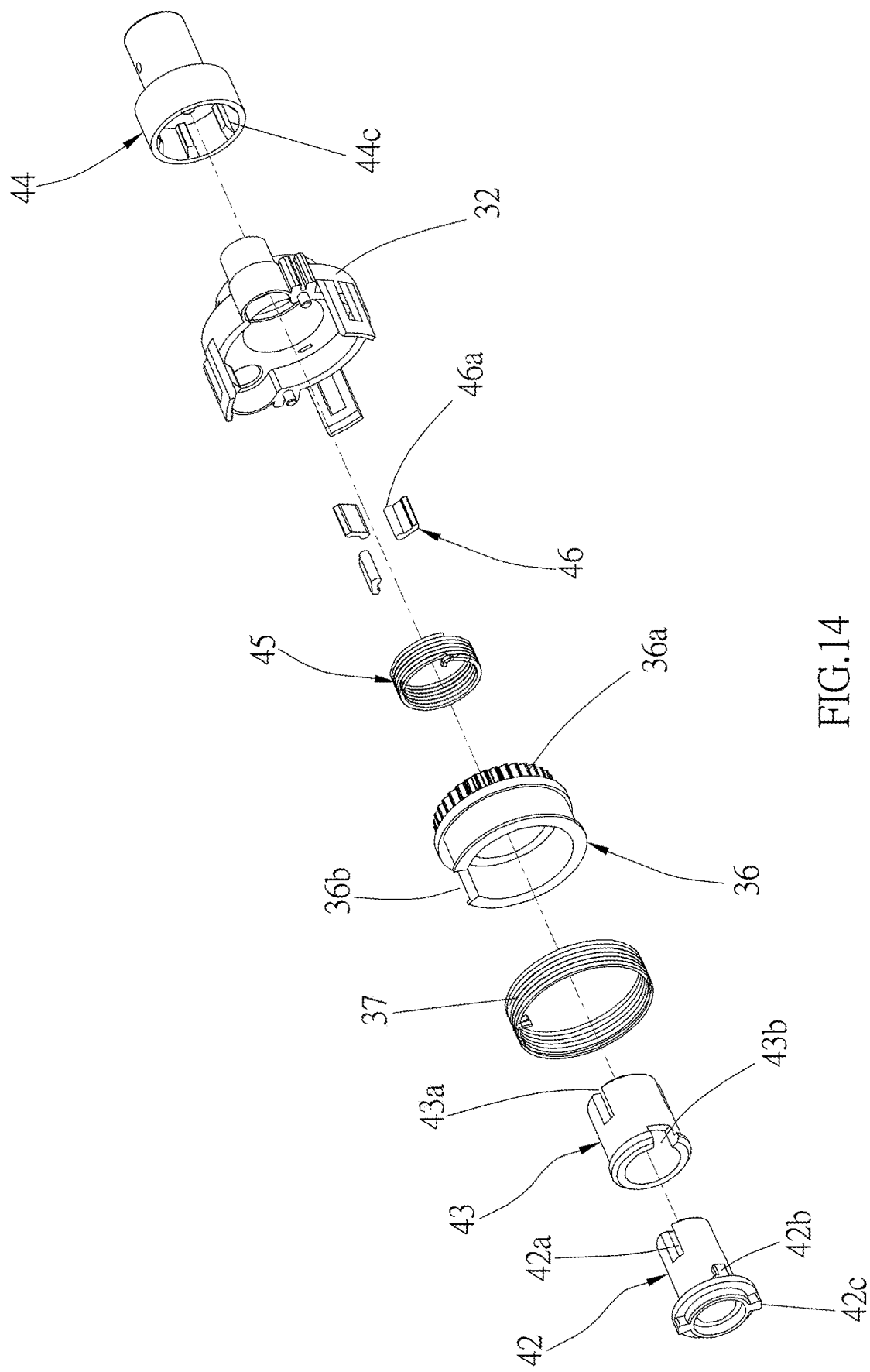
Figure 15:
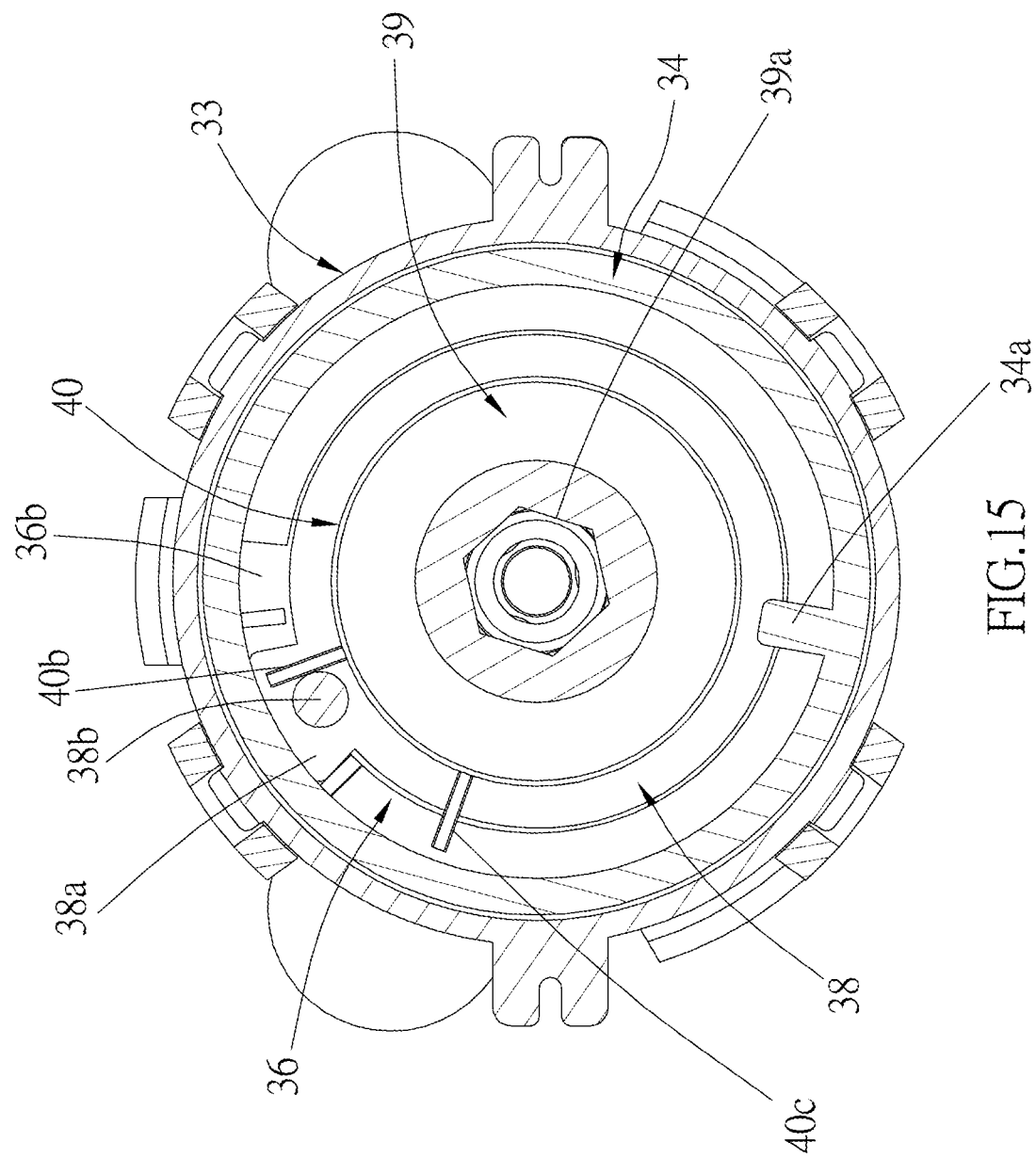
FIG. 15 is a sectional view along the 15-15 line in FIG. 7.

As shown in FIG. 13 to FIG. 15, the adjustment output wheel 36 is a circular frame, which can be defined to have a first half portion and a second half portion, wherein the first half portion has a toothed segment 36a provided on a surface thereof, and the second half portion is provided with a notch 36b. The first brake spring 37 fits around the second half portion of the adjustment output wheel 36, with two ends thereof extending into the notch 36b. The transmission wheel 38 is provided in the adjustment output wheel 36, and has a first block 38a provided in a radial direction thereof. The first block 38a is also located in the notch 36b of the adjustment output wheel 36. A pushing portion, which is constituted of a post 38b, stands on the first block 38a in parallel to an axial direction of the transmission wheel 38. The adjustment clutch wheel 39 has a non-circular first coupling hole 39a provided at a center thereof, wherein the second coupling post 29a of the intermediate plate 29 is inserted into the first coupling hole 39a, so that the adjustment clutch wheel 39 could be rotated by the output end of the deceleration unit.

Figure 8:
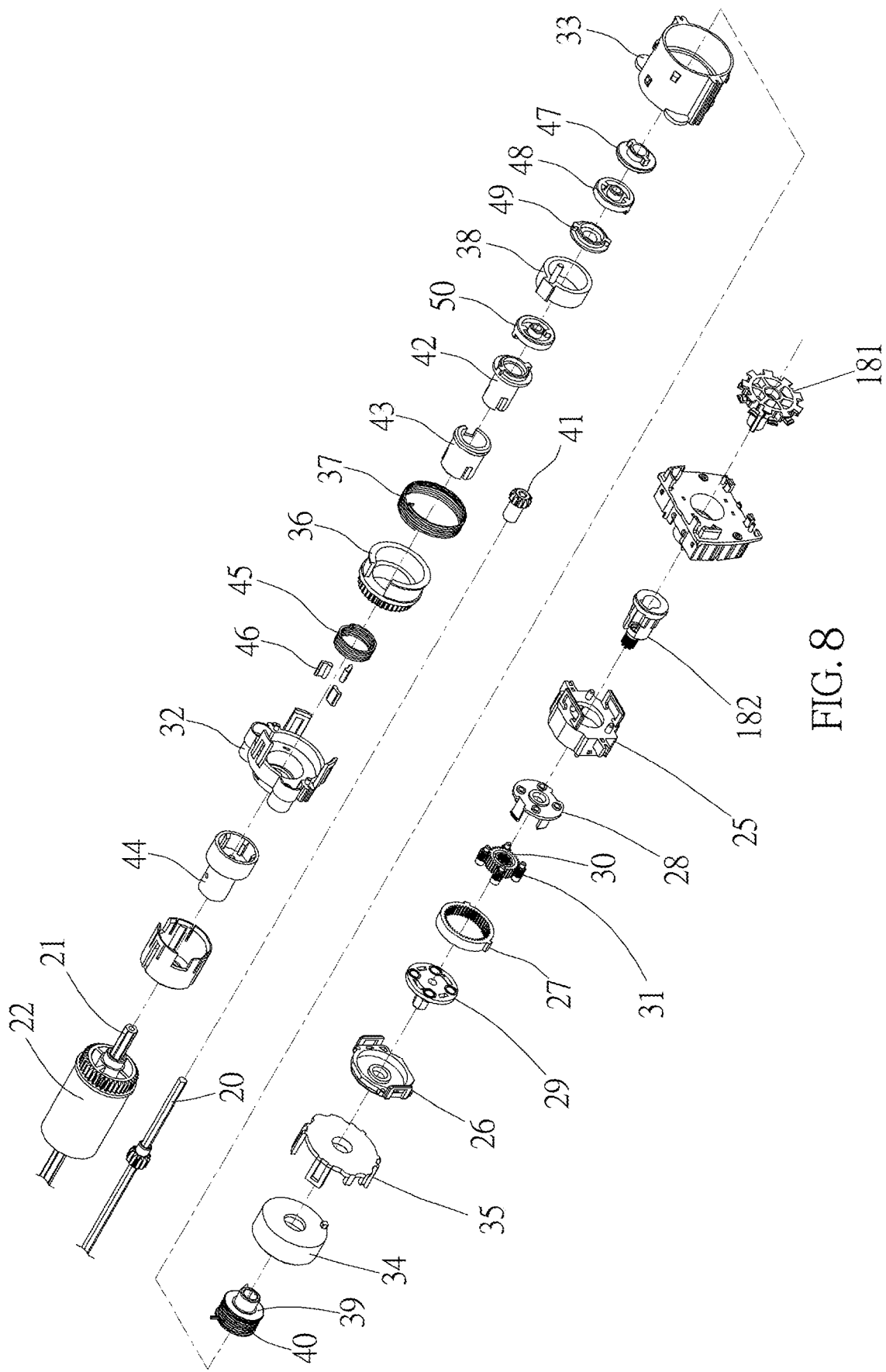
FIG. 8 is an exploded perspective view, showing all detailed components used to control the window blind.
Figure 9:
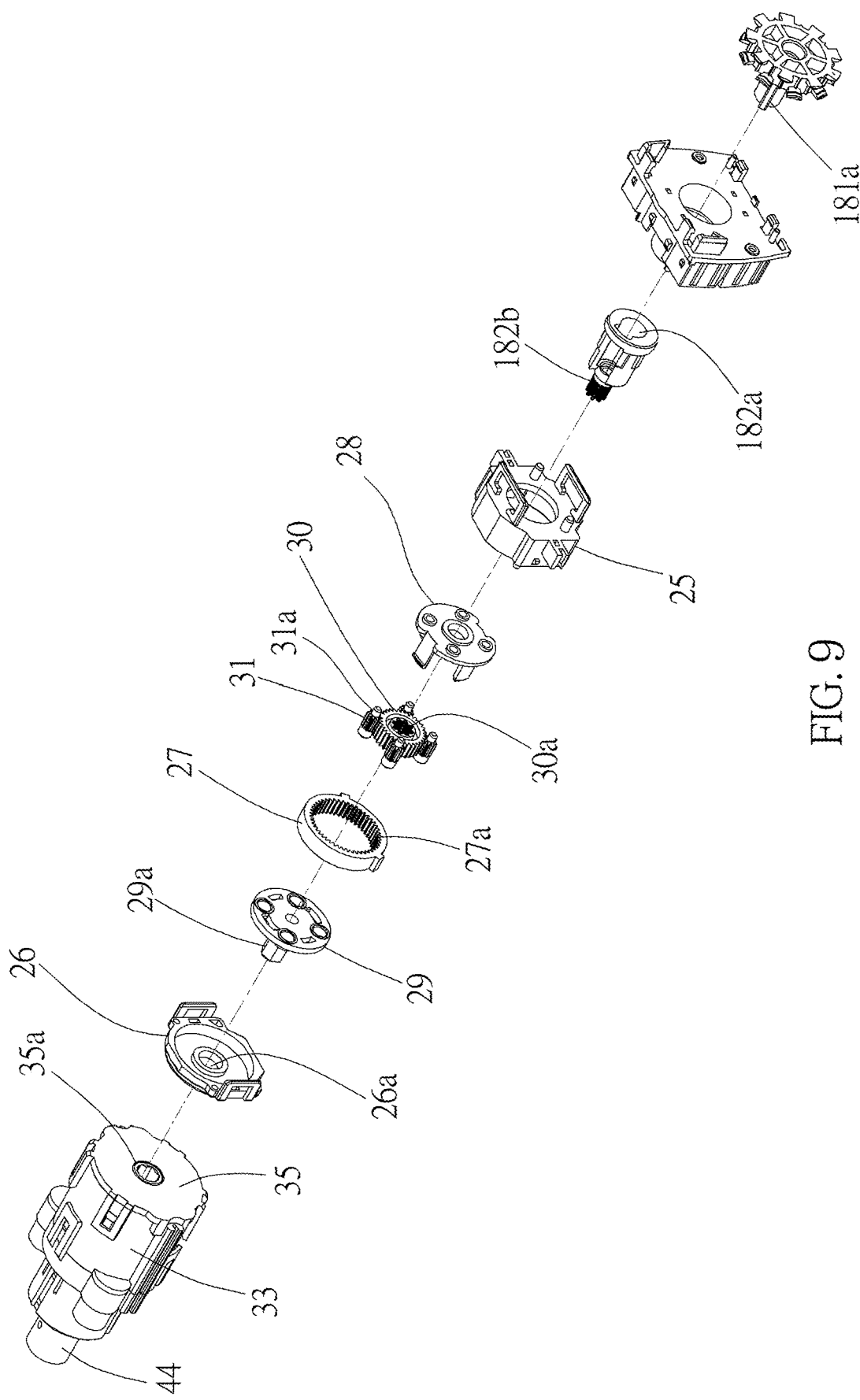
FIG. 9 is an exploded perspective view of part of the components used to control the window blind.
Figure 10:
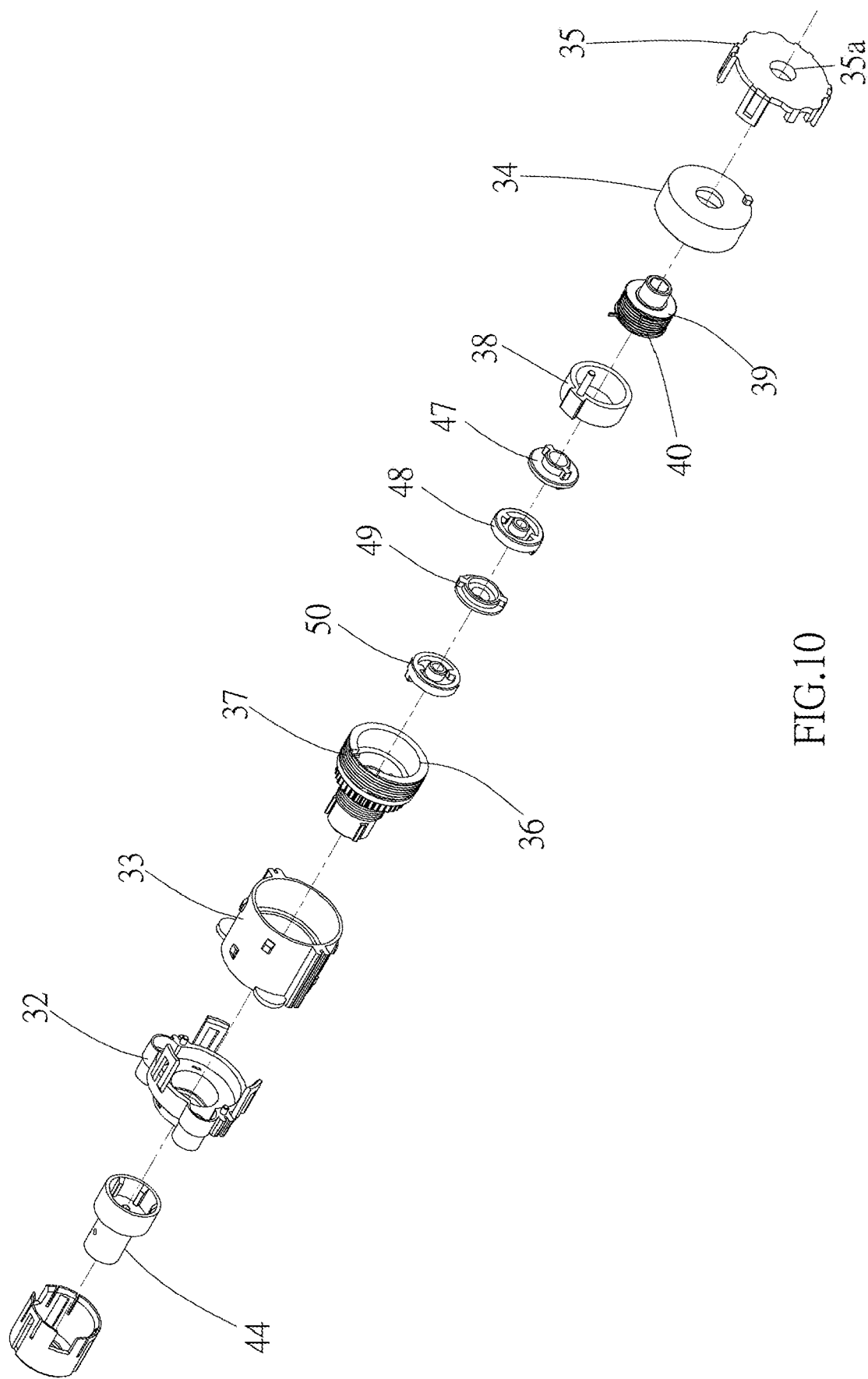
FIG. 10 and FIG. 11 are exploded perspective views, showing another part of the components used to control the window blind.
Figure 11:
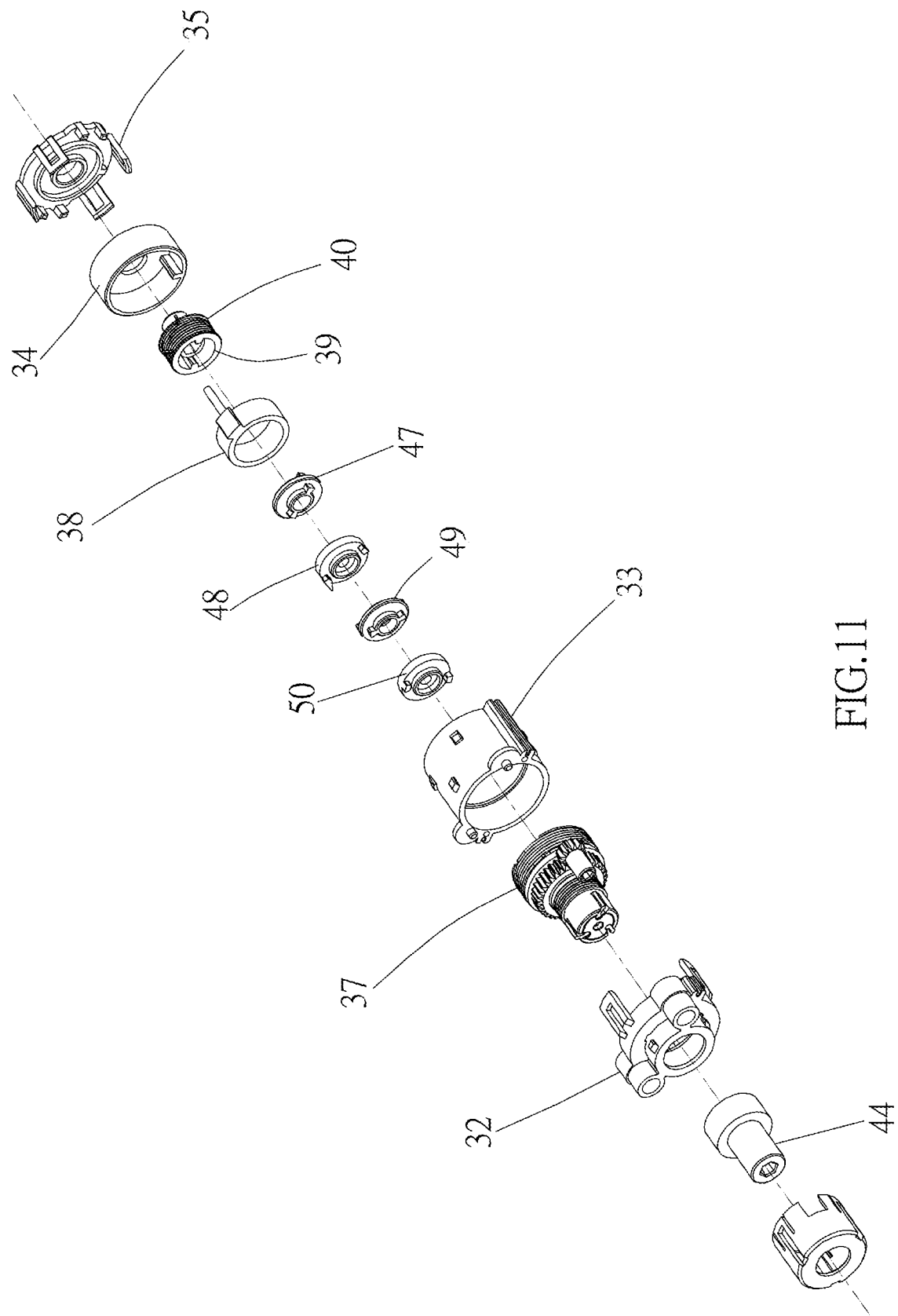

The adjustment clutch spring 40 has a main portion 40a and two end legs 40b, 40c, which are respectively connected to a front side and a rear side of the main portion 40a, and are staggered from each other. The main portion 40a fits around the adjustment clutch wheel 39, and is tightened thereon in a normal condition, whereby the adjustment clutch spring 40 could be rotated along with the adjustment clutch wheel 39. The post 38b is located between the end legs 40b, 40c, and is confined therebetween. When the adjustment clutch wheel 39 is rotated, the adjustment clutch spring 40 in the tightened state would rotate the transmission wheel 38 by pushing the post 38h with one of the end legs of the adjustment clutch spring 40, and the transmission wheel 38 would rotate the adjustment output wheel 36 by pushing the adjustment output wheel 36 with the first block 38a of the transmission wheel 38. As for the adjustment driven wheel 41, an end thereof is connected to the first shaft 20, while another end thereof is provided with a gear 41a, which meshes with the toothed segment 36a of the adjustment output wheel 36, as illustrated in FIG. 8. In this way, when the adjustment output wheel 36 is rotated, the adjustment driven wheel 41 would be rotated as well, whereby to rotate the first shaft 20.

As shown in FIG. 13 and FIG. 14, the output clutch mechanism of the current embodiment includes an input end 42, a driving shaft 43, a driven shaft 44, a second brake spring 45, and a one-way clutch. The input end 42 is rotatably provided in the front tube 32, with a part of the input end 42 extending out of the front tube 32. The input end 42 has a plurality of coupling slots 42a provided at an end thereof in radial directions, wherein each of the coupling slots 42a has a curved slot bottom, and the input end 42 has a third block 42b provided at another end thereof. The driving shaft 43, which is a hollow round tube fitting around the input end 42, has a plurality of openings 43a provided at an end of driving shaft 43, and has a notch 43b at another end thereof, wherein the number of the opening 43a equals the number of the coupling slots 42a, and the opening 43a communicate with the hollow part of the driving shaft 43. The third block 42b of the input end 42 extends into the notch 43b. The one-way clutch is provided between the input end 42 and the driven shaft 44. In the current embodiment, the one-way clutch includes a plurality of pawls 46, wherein a top end of each of the pawls 46 extends into the corresponding opening 43a, and a terminal end of each of the pawls 46 is a root 46a with a curved surface. The root 46a of each of the pawls 46 is engaged in the corresponding coupling slot 42a, so that the pawls 46 are pivotable. The driven shaft 44 includes a body 44a and an axle tube 44b which are connected to each other, wherein the body 44a fits around the driving shaft 43, and the driven shaft 44 has a plurality of second blocks 44c projected from an inner wall thereof. The axle tube 44b is inserted by an end of the second shaft 21, whereby the second shaft 21 is fixedly connected to the axle tube 44b. The second brake spring 45 fits around the driving shaft 43, with an end leg 45a of second brake spring 45 extending into the notch 43b.

Figure 16:
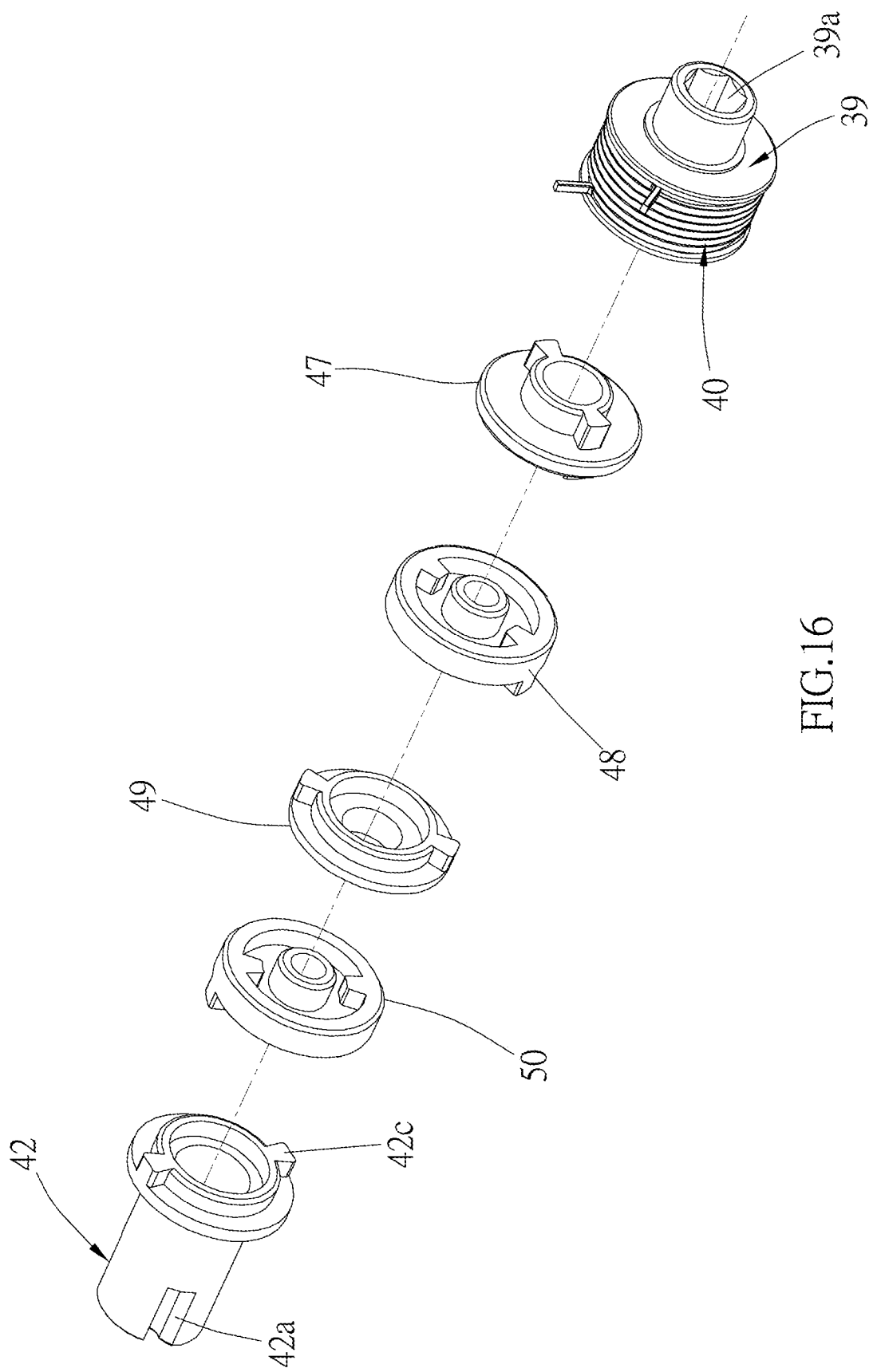
FIG. 16 and FIG. 17 are exploded perspective views of the stroke delay mechanism used to control the window blind.
Figure 17:
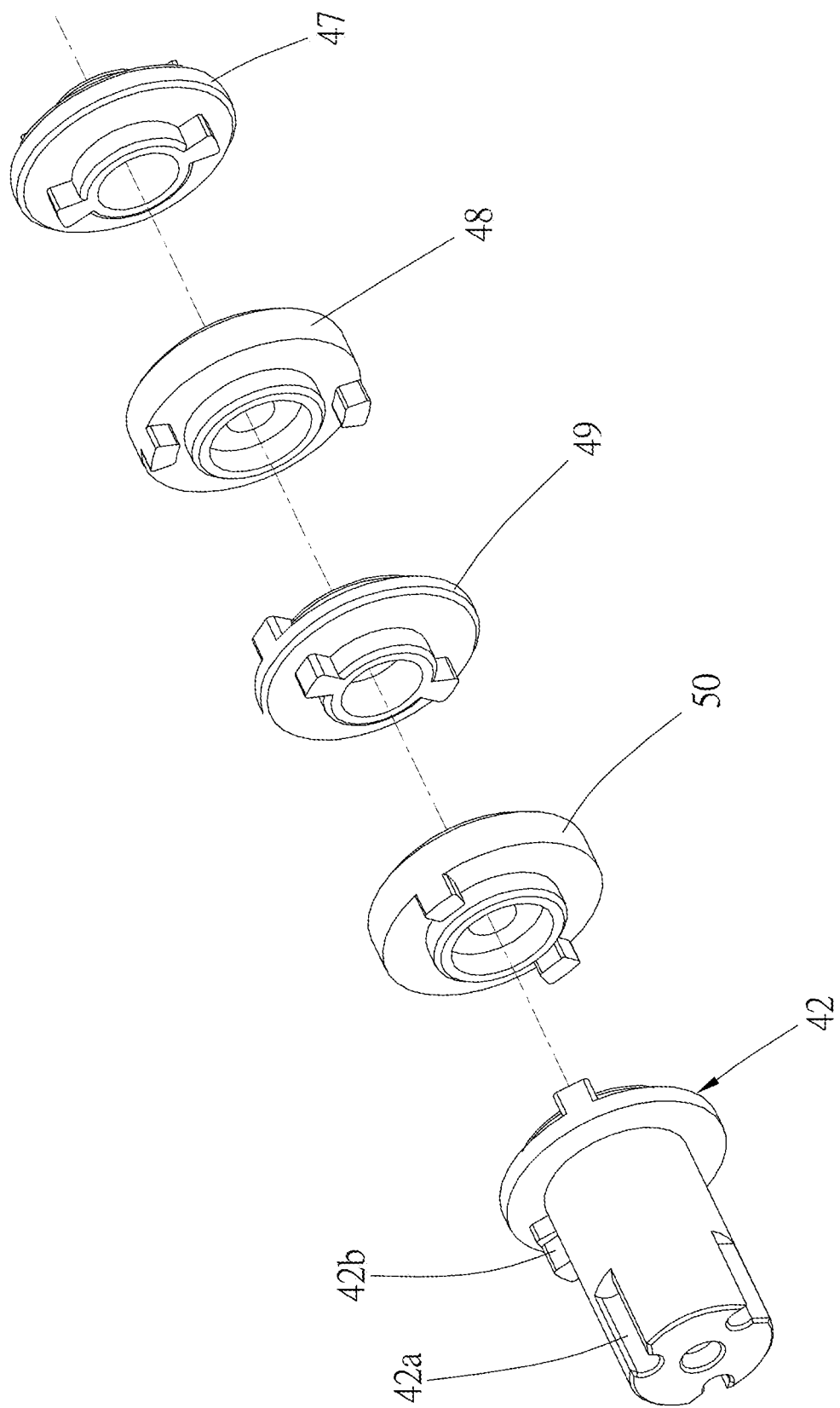
Figure 18:
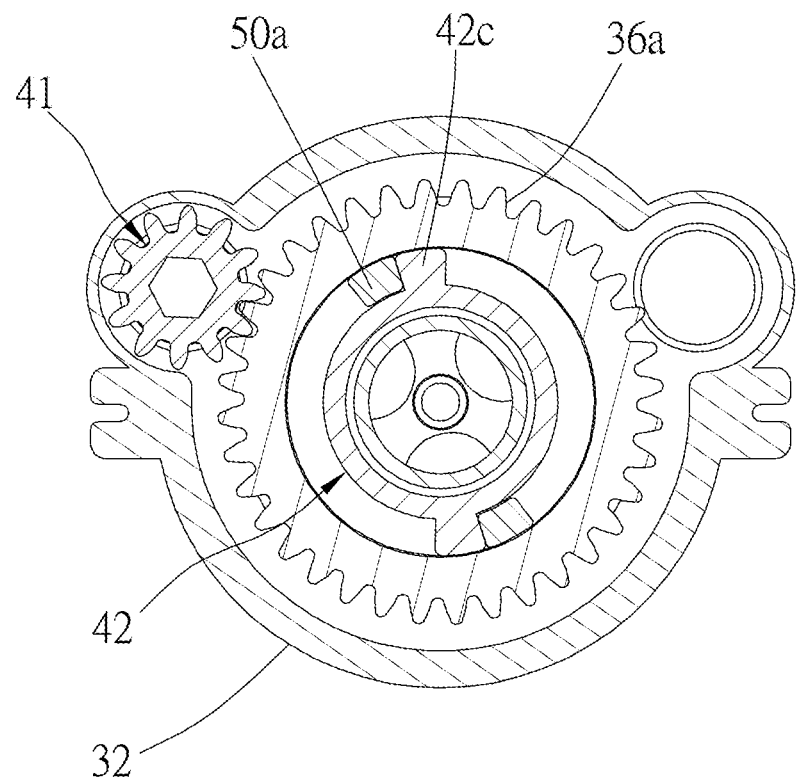
FIG. 18 is a sectional view along the 18-18 line in FIG. 7.

In addition, the stroke delay mechanism in the current embodiment is provided on a transmission path between the output adjustment mechanism and the output clutch mechanism, whereby to delay an affected time for their mutual transmission. As shown in FIG. 16 and FIG. 17, the stroke delay mechanism includes at least one intermediate wheels provided between the adjustment clutch wheel 39 and the input end 42. Furthermore, an initial push block 39b is provided on an end surface of the adjustment clutch wheel 39, and a final push block 42c is provided on an end surface of the input end 42. In the current embodiment, there are four intermediate wheels 47, 48, 49, 50, each of which has a front block and a rear block provided on two opposite sides thereof, respectively. The front block 47a of the intermediate wheel 47 is located on a rotation path of the initial push block 39b of the adjustment clutch wheel 39, and the final push block 42c of the input end 42 is located on a rotation path of the rear block 50a of the intermediate wheel 50, as shown in FIG. 18. Other intermediate wheels are pushed by each other through the front block of one intermediate wheel and the rear block of the adjacent intermediate wheel. A rotating adjustment clutch wheel 39 would push the adjacent intermediate wheel 47 to rotate for a short distance, and then the intermediate wheel 47 would push the adjacent intermediate wheel 48 to rotate for a short distance as well, and so on. Eventually, the input end 42 would be driven to rotate. The total amount of said short distances of rotation would provide a delay effect between the adjustment clutch wheel 39 and the input end 42. In other words, the input end 42 would not rotate until the adjustment clutch wheel 39 is rotated for a certain stroke. However, in practice, the intermediate wheels can be omitted in consideration of the actual distance for stroke delaying. Instead, the final push block could be directly pushed by the initial push block after the initial push block is rotated for a certain distance, which could also achieve the purpose of delaying a stroke. The initial push block, the intermediate wheels, and the final push block of the stroke delay mechanism are arranged in an axial direction in the current embodiment. However, these components can be also arranged in a radial direction in practice, so that the initial push block, the intermediate wheels, and the final push block could be rotated to move one another on the same plane, which could provide the effect of delaying a stroke as well.

The components and their relative locations in the window blind 1 of the current embodiment of the present disclosure have been illustrated above. The operation of the window blind 1 is illustrated below.

Figure 19:
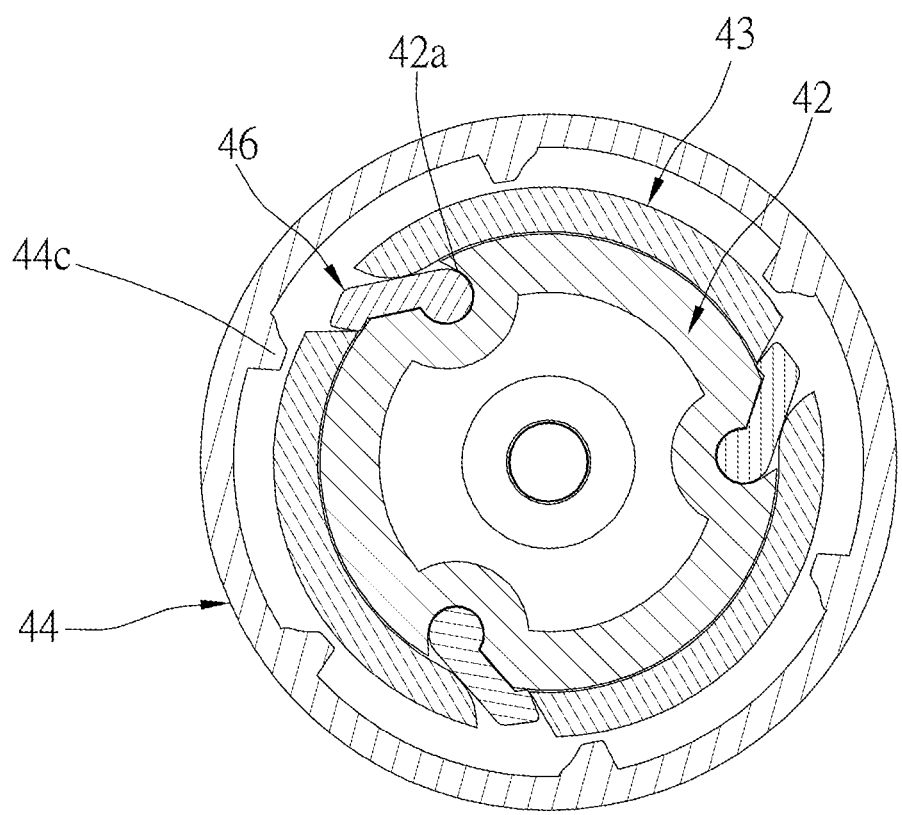
FIG. 19 is a sectional view along the 19-19 line in FIG. 7.

The window blind 1 illustrated in FIG. 1 is in an initial state, wherein the covering material is expanded because the lifting cords 13 are released by the second spools 23, and each of the pieces of fabric 12 is rolled up because the front tape body 11a of each of the ladder tapes 11 are rolled around one of the first spools 22. The rolled-up state of the pieces of fabric 12 is defined as a second state in the current embodiment. At this moment, the pawls 46 of the output clutch mechanism are confined by the driving shaft 43 to keep abutting against the input end 42, as shown in FIG. 19, wherein the top end of each of the pawls 46 does not extend out of the corresponding opening 43a.

Figure 20:
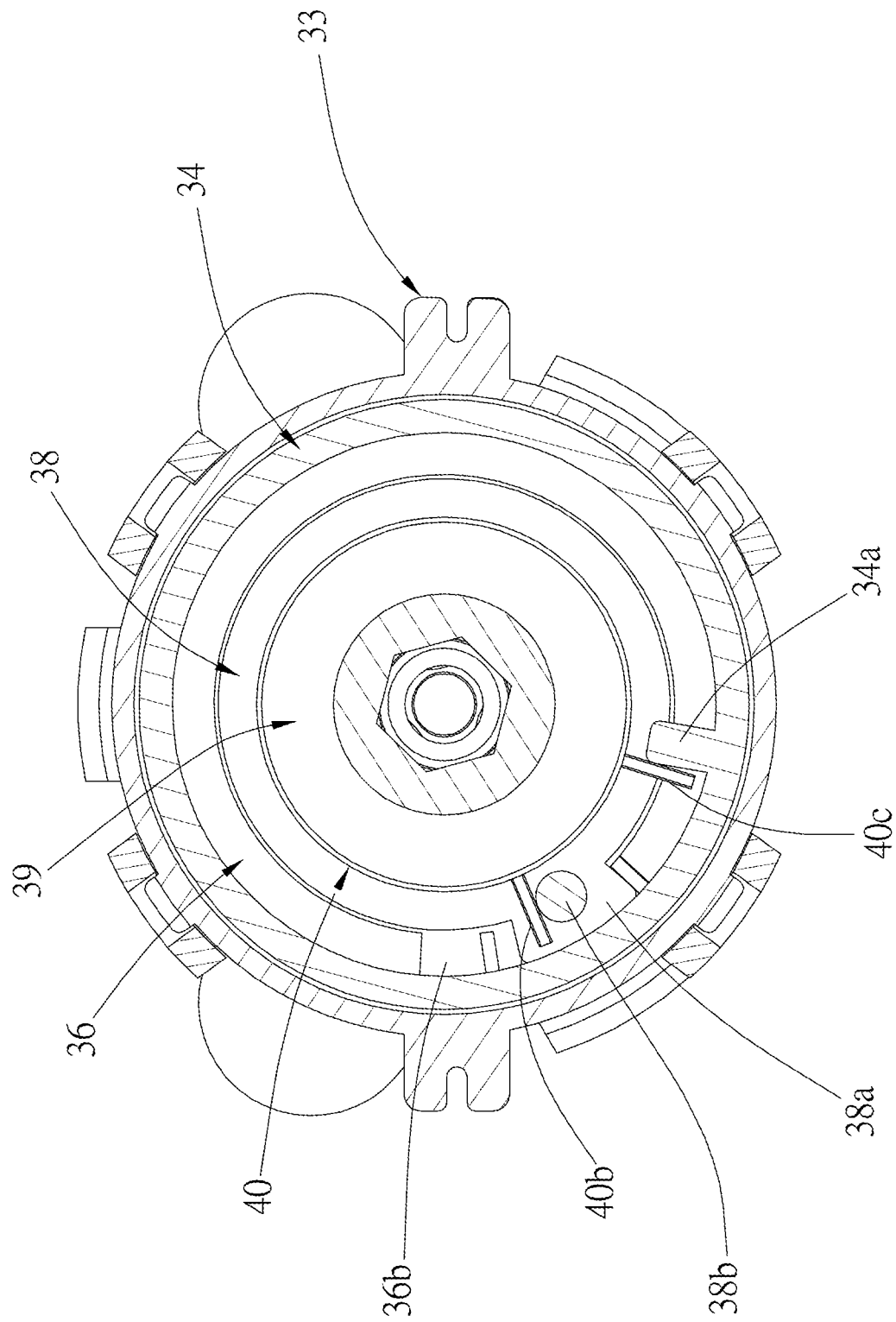
FIG. 20 is similar to FIG. 15, showing the adjustment output wheel of the output adjustment mechanism is pushed and rotated.

When the front side cord 14a is pulled downward, the rotating wheel 18 would be rotated to drive (i.e., to rotate) the adjustment clutch wheel 39 through the deceleration unit, as shown in FIG. 15. Since the adjustment clutch spring 40 tightly fits around the adjustment clutch wheel 39 in the normal condition, the adjustment clutch spring 40 would push against the post 38b through the end leg 40b thereof, whereby the adjustment output wheel 36 would be rotated in the same direction as well through the pushing of the first block 38a. FIG. 20 shows that the adjustment output wheel 36 is rotated, and the end leg 40c of the adjustment clutch spring 40 abuts against the stopper 34a of the rear tube 34. At this moment, the post 38b is near the stopper 34a, but is still a distance apart from the stopper 34a.

Figure 21:
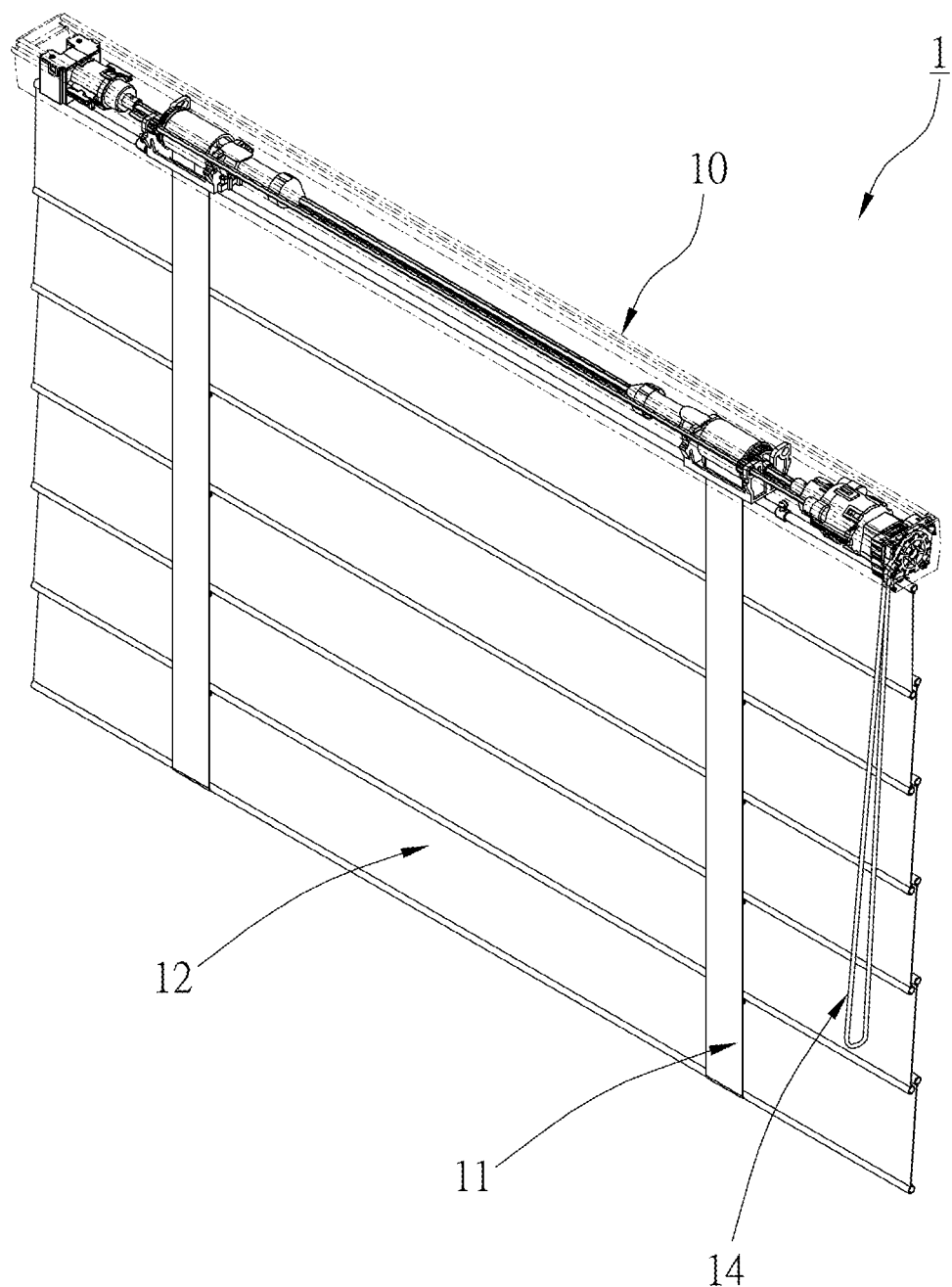
FIG. 21 is similar to FIG. 1, showing the window blind of the embodiment of the present disclosure is expanded, and the pieces of fabric are expanded.

During the process of rotating the adjustment output wheel 36 from the state shown in FIG. 15 to the state shown in FIG. 20, the pieces of fabric 12 would be changed from the rolled-up state to an expanded state, wherein the expanded state of the pieces of fabric 12 is defined as a first state in the current embodiment. Meanwhile, the stroke delay mechanism would finish its predetermined stroke. More specifically, the rotated adjustment output wheel 36 would drive (i.e., rotate) the adjustment driven wheel 41 through the toothed engagement between the toothed segment 36a of the adjustment output wheel 36 and the gear 41a, whereby to rotate the first shaft 20. Since each of the gears 17 meshes with one of the outer toothed rings 22a, the first spools 22 would be rotated synchronously to release the front tape bodies 11a of the ladder tapes 11. As a result, the front tape body 11a would be moved relative to the rear tape body 11b in a vertical direction for each of the ladder tapes 11, so that each of the pieces of fabric 12 would be no longer supported by the corresponding weft 11c, and therefore each of the pieces of fabric 12 would naturally droop and expand due to the counterweight effect provided by the thin rod 16 below. In this way, the window blind 1 would be in the state illustrated in FIG. 21, which could block light completely. On the other hand, after the stroke delay mechanism finishes its predetermined stroke, the adjustment clutch wheel 39 would indirectly contact with the input end 42 through the intermediate wheels intermediating between the adjustment clutch wheel 39 and the input end 42. In other words, if the adjustment clutch wheel 39 keeps rotating, the input end 42 would be synchronously rotated with the adjustment clutch wheel 39.

Figure 22:
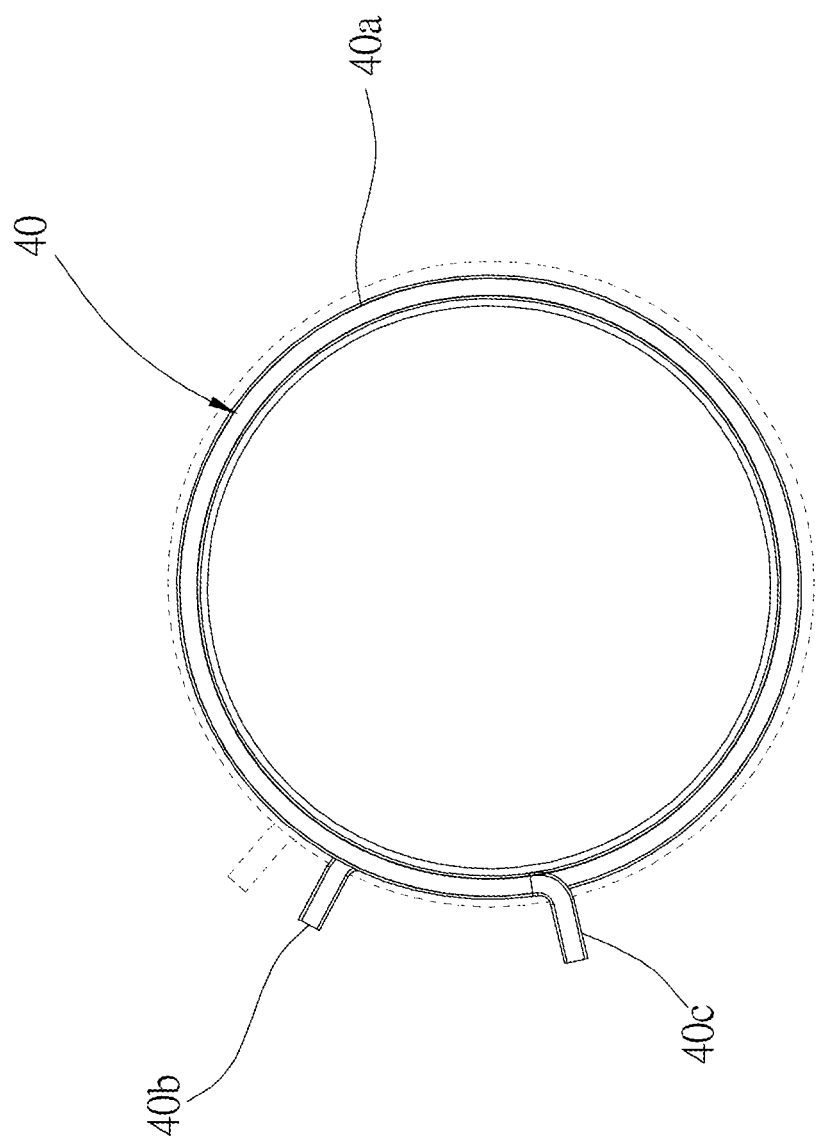
FIG. 22 is a side view, showing the inner diameter of the adjustment clutch spring is expanded.

When the front side cord 14a is pulled downward, the end leg 40c of the adjustment clutch spring 40 would not move for being stopped by the stopper 34a of the rear tube 34, and the end leg 40b would then push the post 38b toward the stopper 34a along with the rotation of the adjustment clutch wheel 39, whereby a distance between the end leg 40b and the end leg 40c would be shortened. Since the end leg 40b and the end leg 40c are staggered, an inner diameter of the main portion 40a would be slightly expanded as illustrated by the imaginary lines in FIG. 22. Therefore, the adjustment clutch spring 40 would no longer tightly fit around the adjustment clutch wheel 39. Because the adjustment clutch wheel 39 would be no longer able to drive the adjustment clutch spring 40 in such a condition, the adjustment output wheel 36 would stop rotating, which means the pieces of fabric 12 would stay in the expanded state.

Figure 23:
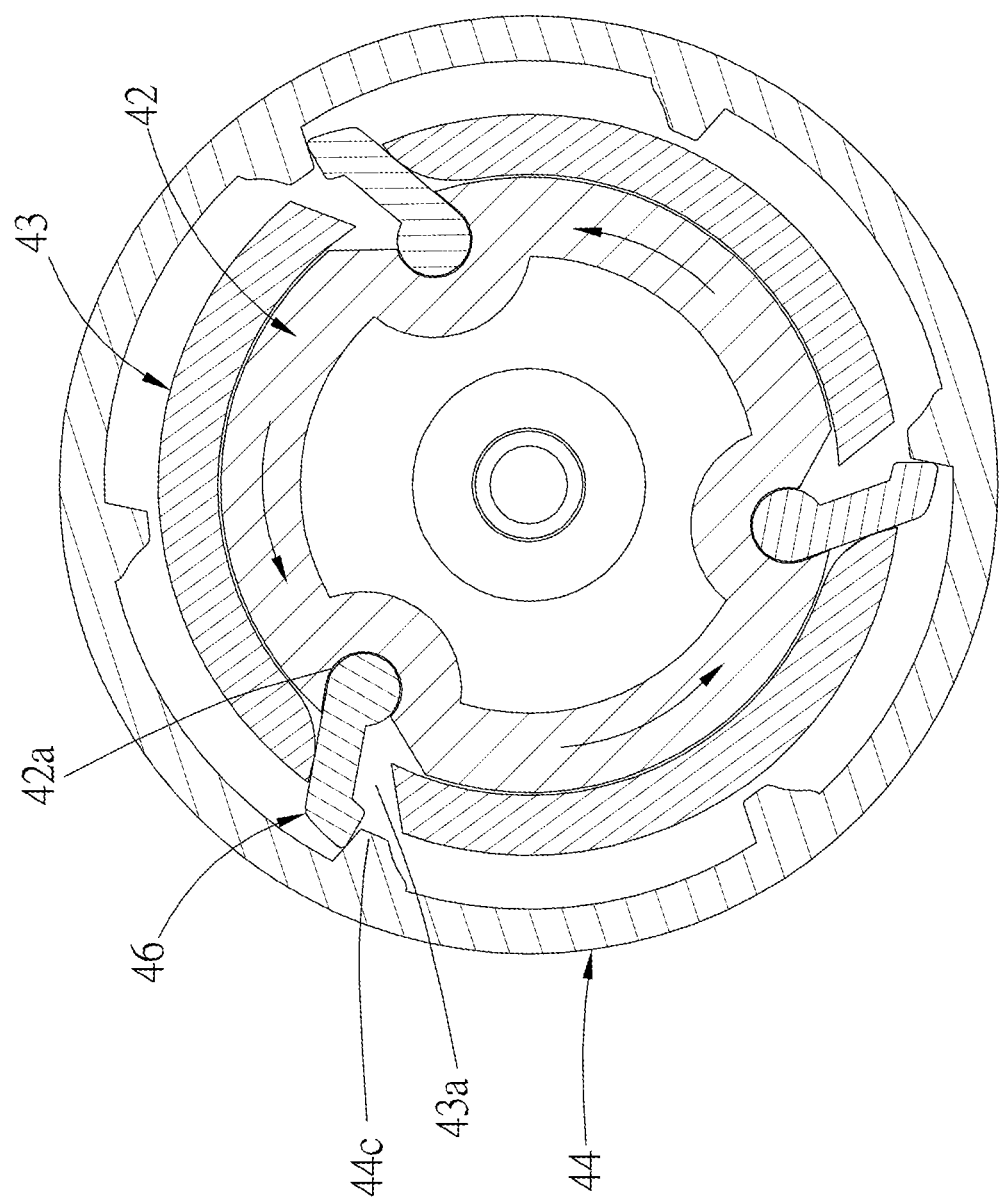
FIG. 23 is similar to FIG. 19, showing the input end of the output clutch mechanism is rotated, with the pawls extending out.

If the front side cord 14a is continuously pulled, the input end 42 would be directly driven to rotate, for the stroke delay mechanism has finished its predetermined stroke. As shown in FIG. 23, the rotated input end 42 would force the pawls 46 to pivot, and the top end of each of the pawls 46 would extend out of the corresponding opening 43a to abut against the corresponding second block 44c, whereby to push and rotate the driven shaft 44 along with the second shaft 21, which would make the second spools 23 start to roll up the lifting cords 13. In this way, the lowest piece of fabric 12 would be moved toward the fixed rail 10, and the window blind 1 would be collected gradually.

Figure 24:
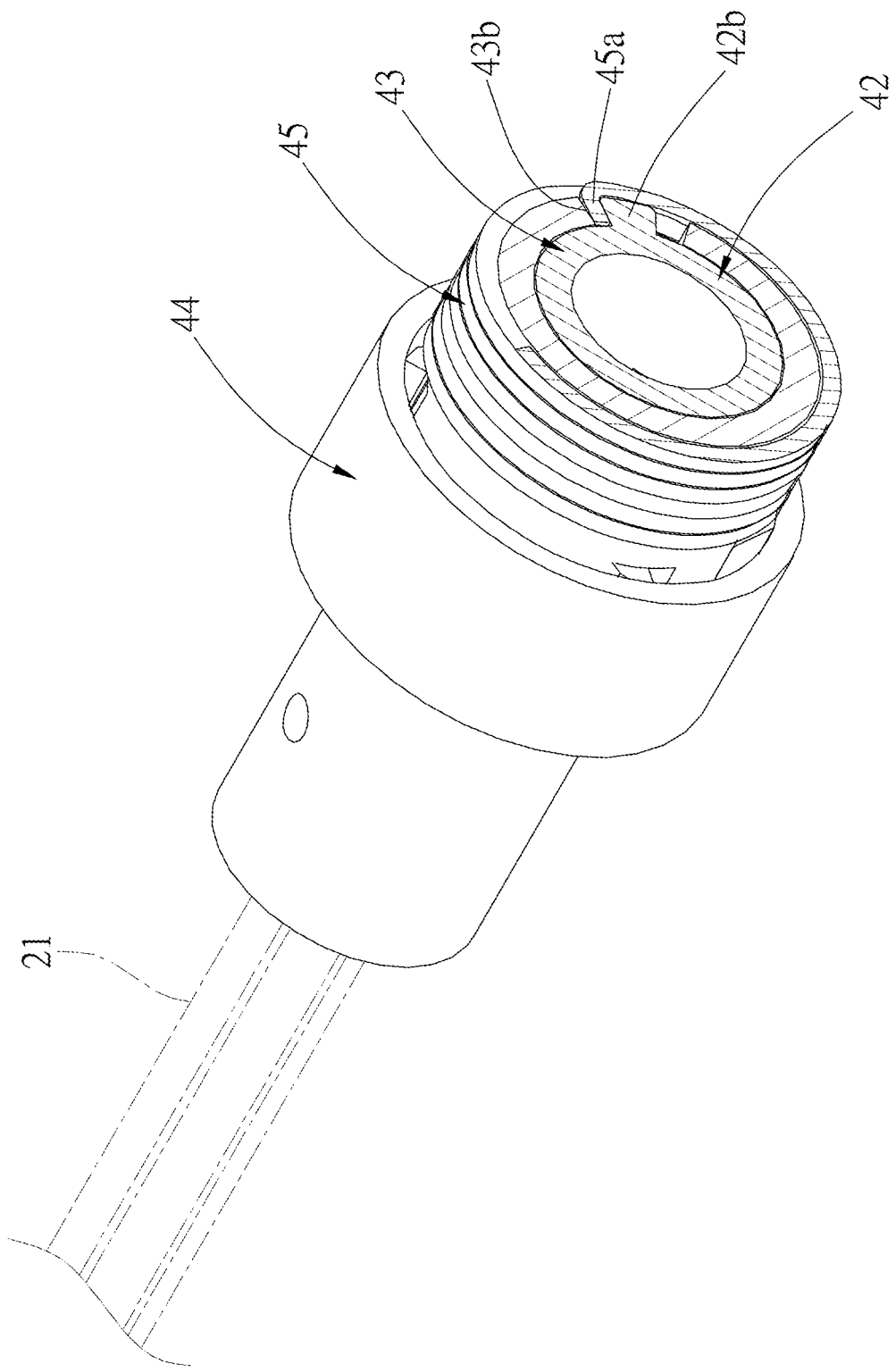
FIG. 24 is a perspective view, showing the connection relation between the input end and the driving shaft of the output clutch mechanism.

During the aforementioned process of collapsing the window blind 1 in an upward direction, if the front side cord 14a is no longer being pulled at any time point, the pieces of fabric 12 which have been laminated would droop due to gravity, and would rotate the second shaft 21 in a reversed direction through the lifting cords 13, which would also rotate the driven shaft 44 and the driving shaft 43 in a reversed direction. As shown in FIG. 24, the reversely rotated driving shaft 43 would push against the end leg 45a of the second brake spring 45 with a side wall of the notch 43b thereof, so as to expand the second brake spring 45 outward to tightly abut against an inner wall (not shown) of the front tube 32 of the first case immediately, whereby a large friction would be generated to restrain the rotation of the driving shaft 43, and therefore all pieces of fabric 12 would stay at their current locations without further drooping. The second brake spring 45 would be expanded outward in an extremely short time, which would be almost simultaneous to the rotation of the second shaft 21. Therefore the user would not notice the slight sinking of the covering material.

Briefly speaking, the operations of expanding the pieces of fabric 12 and collecting the window blind 1 could be both performed by pulling the front side cord 14a. Furthermore, when the downward pulling force is dismissed, the provided second brake spring 45 would immediately generate a braking effect to confine the collected area of the covering material, which could change the amount of light allowed to pass through the covering material. Therefore, the disclosed window blind 1 would be easy to use.

Figure 25:
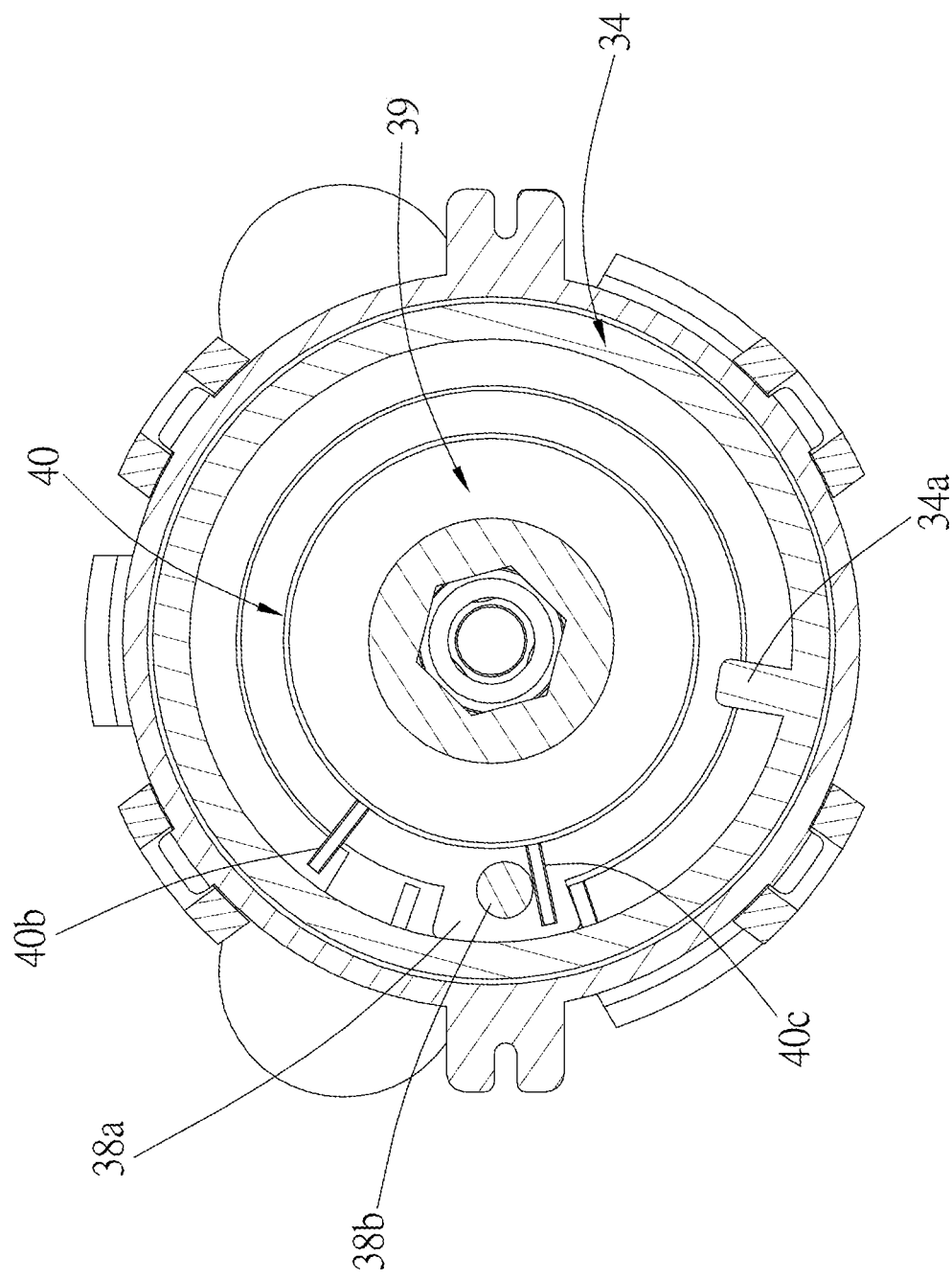
FIG. 25 is similar to FIG. 23, showing the adjustment clutch wheel is rotated in a reversed direction.

The method of expanding the window blind 1 is illustrated below. As shown in FIG. 25, when the rear side cord 14b is pulled downward, the rotating wheel 18 would be driven to rotate in a reversed direction, and the adjustment clutch wheel 39 and the adjustment clutch spring 40 would be also rotated in a reversed direction to repeat the aforementioned stroke. The rotating wheel 18 would drive the adjustment clutch wheel 39 to rotate through the deceleration unit. Furthermore, with the stroke delay mechanism, the adjustment output wheel 36 would be rotated in a reversed direction first to indirectly rotate the first shaft 20 in a reversed direction, which would make the first spools 22 to roll up part of the front tape body 11a of each of the ladder tapes 11 in advance, whereby the pieces of fabric 12 would change from the expanded state to the rolled-up state in advance. After pulling the rear side cord 14b downward for a short distance, the stroke delay mechanism would finish its predetermined stroke, and then the input end 42 would be driven. At this time, the input end 42 would quickly draw the pawls 46 back into the openings 43a of the driving shaft 43, wherein the top end of each of the pawls 46 would no longer abut against the corresponding second block 44c of the driven shaft 44, as illustrated in FIG. 19. After that, the second shaft 21 which bears the weight of the pieces of fabric 12 would drive the driven shaft 44 to rotate on free relative to the input end 42, so as to release the lifting cords 13 from the second spools 23. Therefore, the pieces of fabric 12 would automatically descend. It should be noted that, while collecting the window blind 1, the pieces of fabric 12 are in the expanded state; while expanding the window blind 1, the pieces of fabric 12 would change into the rolled-up state in advance during the process of pulling the rear side cord 14b downward for a short distance. In this way, once the window blind 1 is fully expanded, the pieces of fabric 12 would be in the rolled-up state illustrated in FIG. 1. When the front side cord 14a is pulled again, the pieces of fabric 12 could be expanded again.

It is worth mentioning that, during the process of expanding the window blind 1, the first spools 22 might be reversely rotated due to the inconsistent weight bearing on the front tape body 11a and the rear tape body 11b of each of the ladder tapes 11. If this happens, the first brake spring 37 would be expanded outward immediately to tightly abut against an inner wall of the middle tube 33, generating a significant friction to prevent the adjustment output wheel 36 from rotating, which would ensure the pieces of fabric 12 to stay in the rolled-up state. Similarly, the first brake spring 37 would be expanded outward in an extremely short time, which is almost simultaneous to the rotation of the first shaft 20. Therefore the user would not even notice the slight change of the pieces of fabric 12.

During the process of expanding the window blind 1, the pawls 46 could be urged to go back to abut against the second blocks 44c of the driven shaft 44 by simply pulling the front side cord 14a for a short distance further, and the window blind 1 would stop expanding.

It can be seen from the above descriptions, in the window blind 1 of the current embodiment in the present disclosure, the mechanism for collecting and expanding the covering material and the mechanism for rolling up and expanding the pieces of fabric 12 could be integrated into one single control module. For example, by providing the deceleration unit between the fixing tube 25 and the side cap 26, or by providing the output adjustment mechanism and the output clutch mechanism between the front tube 32 and the end cap 35, the window blind 1 could be conveniently and quickly installed. Needless to say, if there is sufficient room for a larger size, each mechanism could be reasonably dismantled and assembled. In other words, the modular arrangement is not a limitation of the present disclosure. To perform the operations of expanding the pieces of fabric 12 and collecting the window blind 1 by pulling the front side cord 14a would be simple and easy to use. Furthermore, with the immediate braking effect provide by the first brake spring 37 and the second brake spring 45, the pieces of fabric 12 could be ensured to remain in the rolled-up state and to stay at a require location. In addition, said assembly of planet gears is optional, and can be omitted to meet different product requirements. Also, the assembly of the planet gears can be provided at locations other than the above-described location. In addition, in practice, the first state and the second state of the pieces of fabric 12 are the results of relative moving the front tape body 11a and the rear tape body 11b of each of the ladder tape 11s in the vertical direction to two extreme locations, and therefore the rotation direction of each mechanism can be adjusted as required to exchange the behaviors defined as the first state and the second state. In other words, the pieces of fabric 12 could be expanded when the window blind 1 is expanded, and could be rolled up when the window blind 1 is collected.

Figure 26:
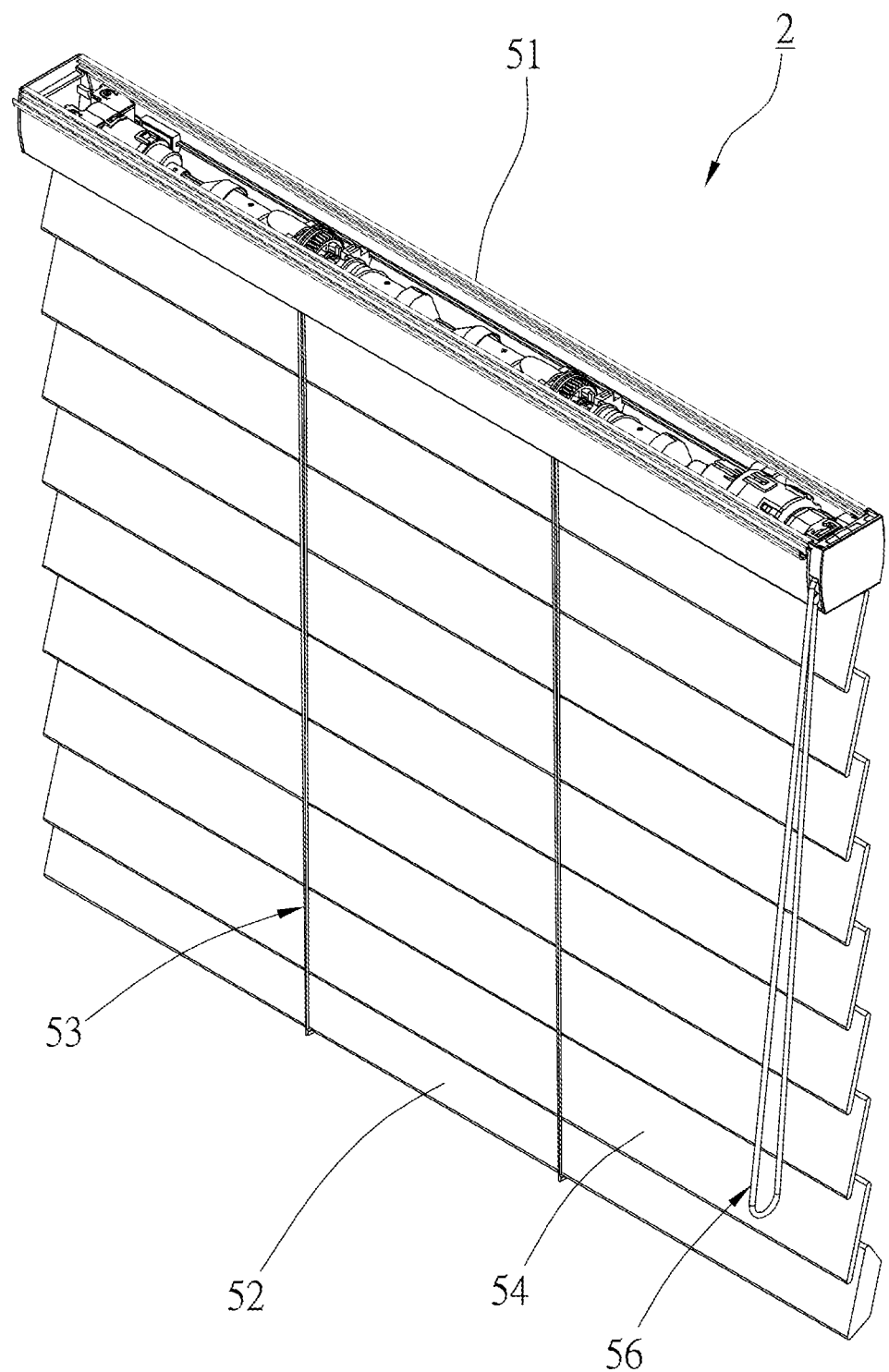
FIG. 26 is a perspective view of the window blind of another embodiment of the present disclosure.
Figure 27:
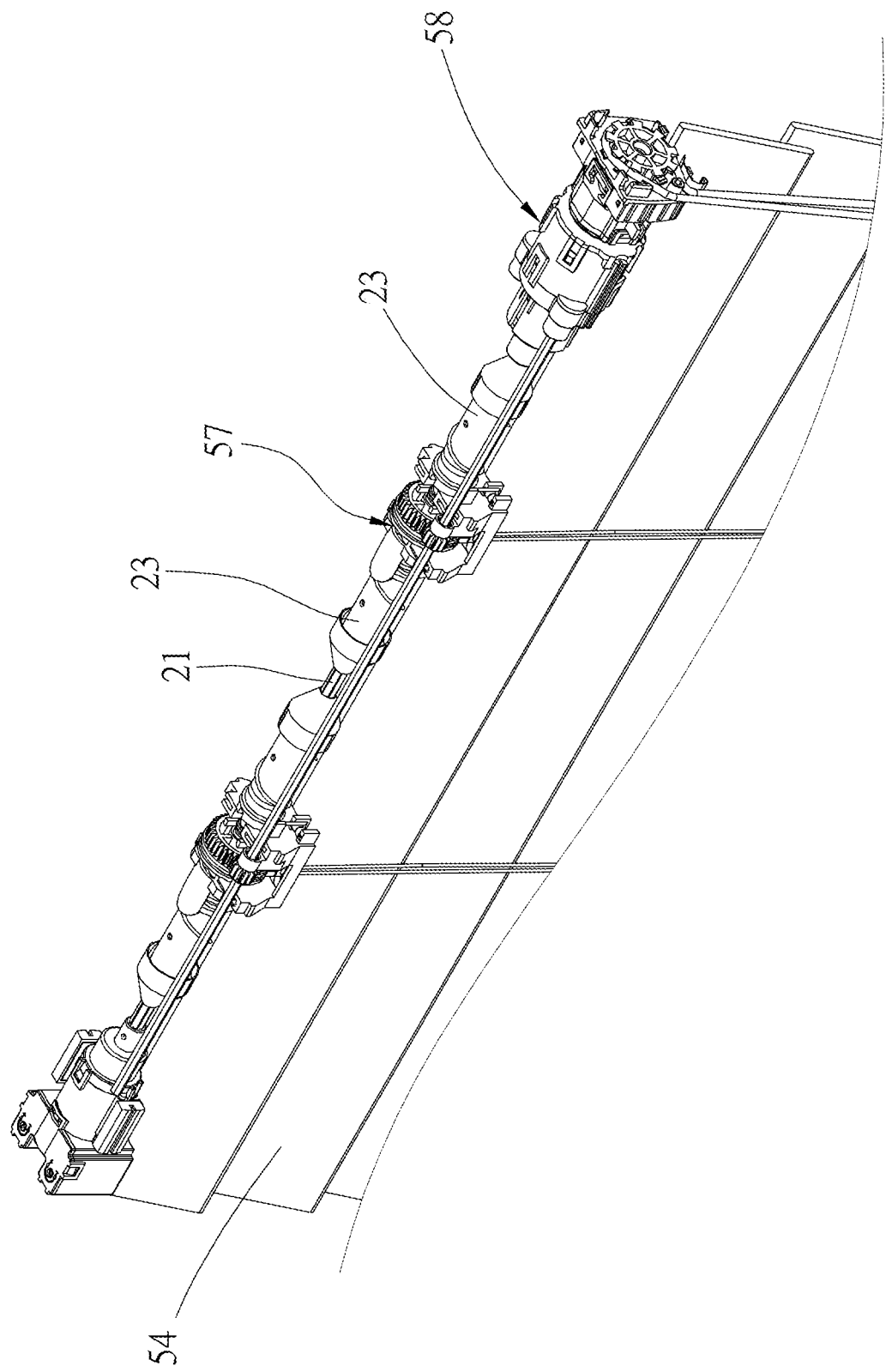
FIG. 27 is a partial perspective view of FIG. 26.
Figure 28:
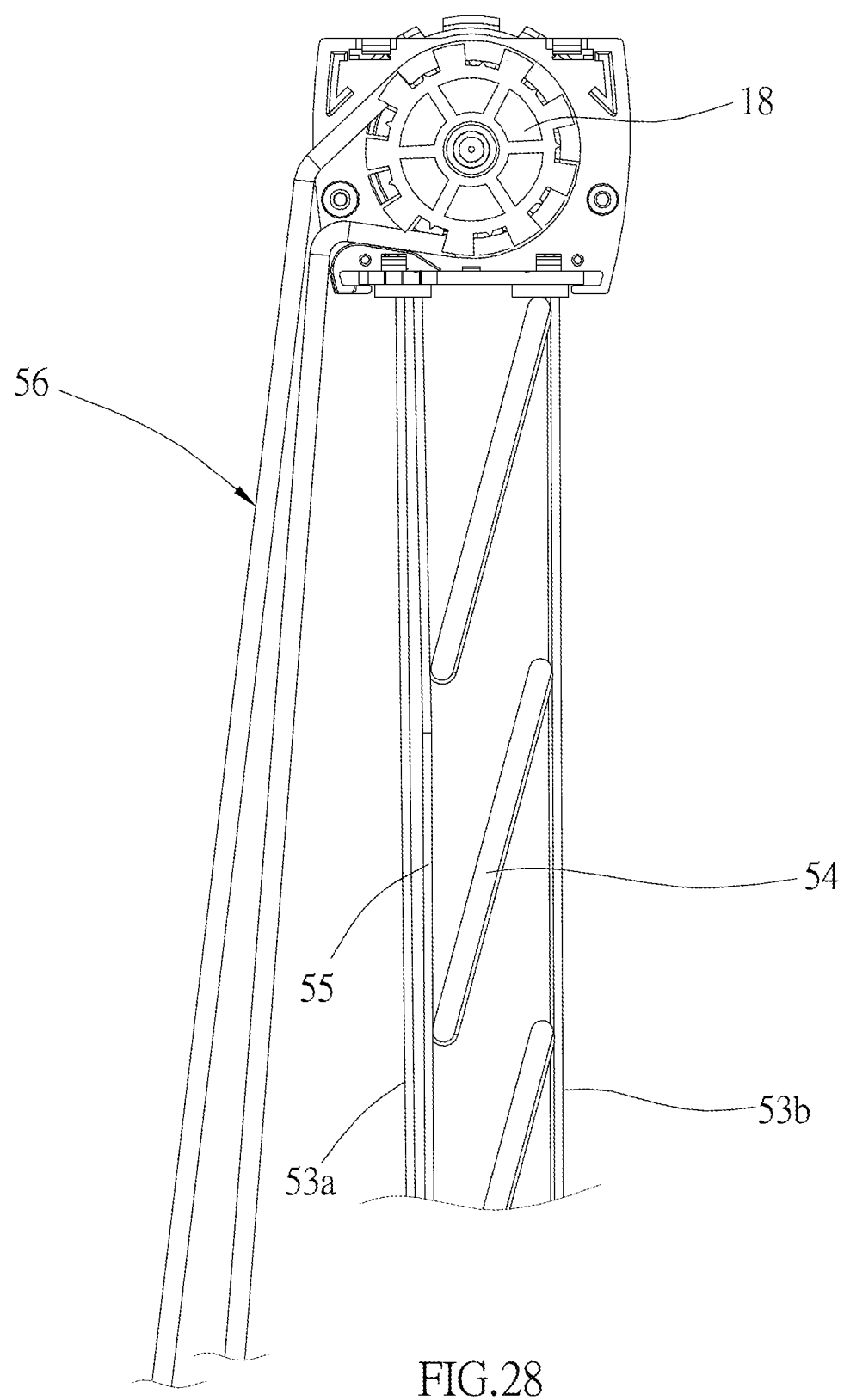
FIG. 28 is a side view of FIG. 27, showing a lateral edge of the slats corresponding to the front tape body is lower than a lateral edge thereof corresponding to the rear tape body.

The slats are long pieces of fabric made of a flexible material in the above embodiment as an example. However, in practice, the control mechanisms disclosed in the present disclosure could be also applied to long slats made of a rigid material. As shown in FIG. 26 to FIG. 28, a window blind 2 of another embodiment of the present disclosure includes a fixed rail 51, a movable rail 52, a ladder tape 53, a plurality of rigid slats 54, a lifting cord 55, and a cord loop 56. The rigid slats 54 are hanged between the fixed rail 51 and the movable rail 52 through the ladder tape 53. The differences between the current embodiment and the previous embodiment include that, instead of using wide bands, a front tape body 53*a* and a rear tape body 53*b* of the ladder tape 53 are both thin cords, which also hang down as described in the previous embodiment. Furthermore, an end of each of the tape bodies 53*a*, 53*b* is connected to the movable rail 52, while another end thereof is connected to a ladder drum 57 which is provided between two second spools 23 used for rolling up the lifting cord 55. The ladder drum 57 has a round hole passed by the second shaft 21, wherein the ladder drum 57 does not rotate along with the second shaft 21. The design of the round hole of the ladder drum 57 is similar to that of the first spools 22 in the previous embodiment. In other words, the inclination angle of the slats 54 could be adjusted by rotating the ladder drum 57 in two opposite directions to relative move the front tape body 53*a* and the rear tape body 53*b* in a vertical direction.

Figure 29:
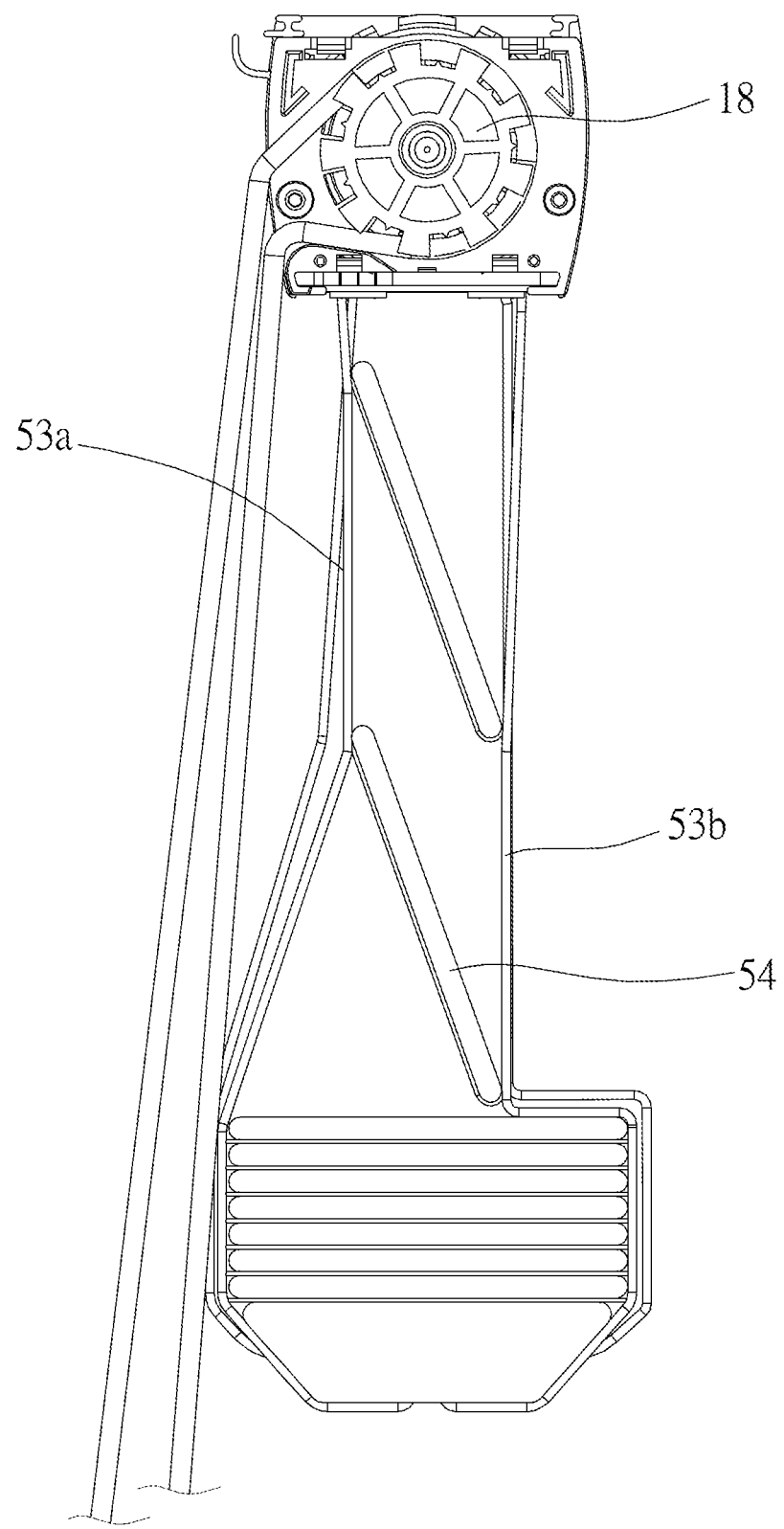
FIG. 29 is similar to FIG. 28, showing a lateral edge of the slats corresponding to the front tape body is higher than a lateral edge thereof corresponding to the rear tape body.

As shown in FIG. 28, in the current embodiment, when the front tape body 53*a* of the ladder tape 53 is moved downward relative to the rear tape body 53*b* of the ladder tape 53, a lateral edge of each of the slats 54 corresponding to the front tape body 53*a* is lower than another lateral edge corresponding to the rear tape body 53*b*, and the lateral edge of one of the slats 54 corresponding to the front tape body 53*a* is lower than the lateral edge of the adjacent slat 54 corresponding to the rear tape body 53*b*. The slats 54 in such a condition are defined to be in a first state. As shown in FIG. 29, when the front tape body 53*a* of the ladder tape 53 is moved upward relative to the rear tape body 53*b* of the ladder tape 53, the lateral edge of each of the slats 54 corresponding to the front tape body 53*a* is higher than the lateral edge corresponding to the rear tape body 53*b*, and the lateral edge of one of the slats 54 corresponding to the front tape body 53*a* is higher than the lateral edge of the adjacent slat 54 corresponding to the rear tape body 53*b*. The slats 54 in such a condition are defined to be in a second state.

As for the output adjustment mechanism, the output clutch mechanism, and the stroke delay mechanism of the current embodiment are integrated into one single modular controller 58, which is installed between the rotating wheel 18 of the input mechanism and one of the second spools 23. The function of the controller 58 is the same as described in the previous embodiment, and therefore we are not going to describe it again herein. However, similar to the previous embodiment, the behaviors of the slats 54 in the first state and the second state can be exchanged as well.

Figure 30:
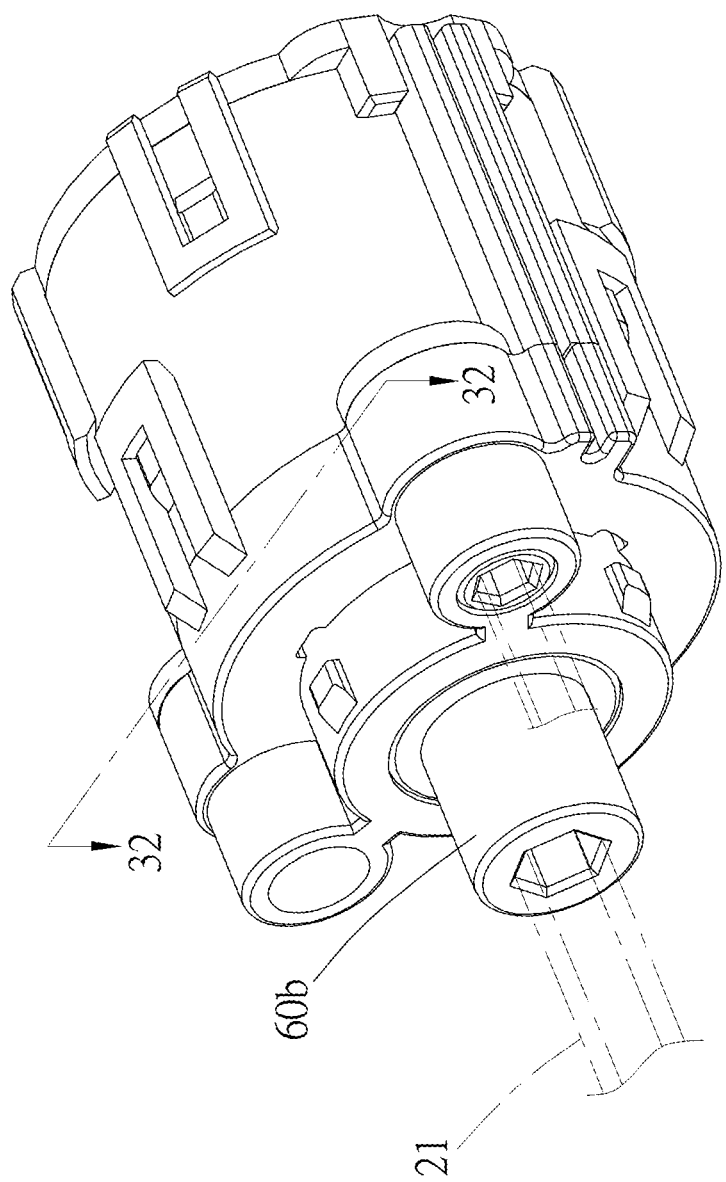
FIG. 30 is a perspective view of the controller of the window blind of yet another embodiment of the present disclosure.
Figure 31:
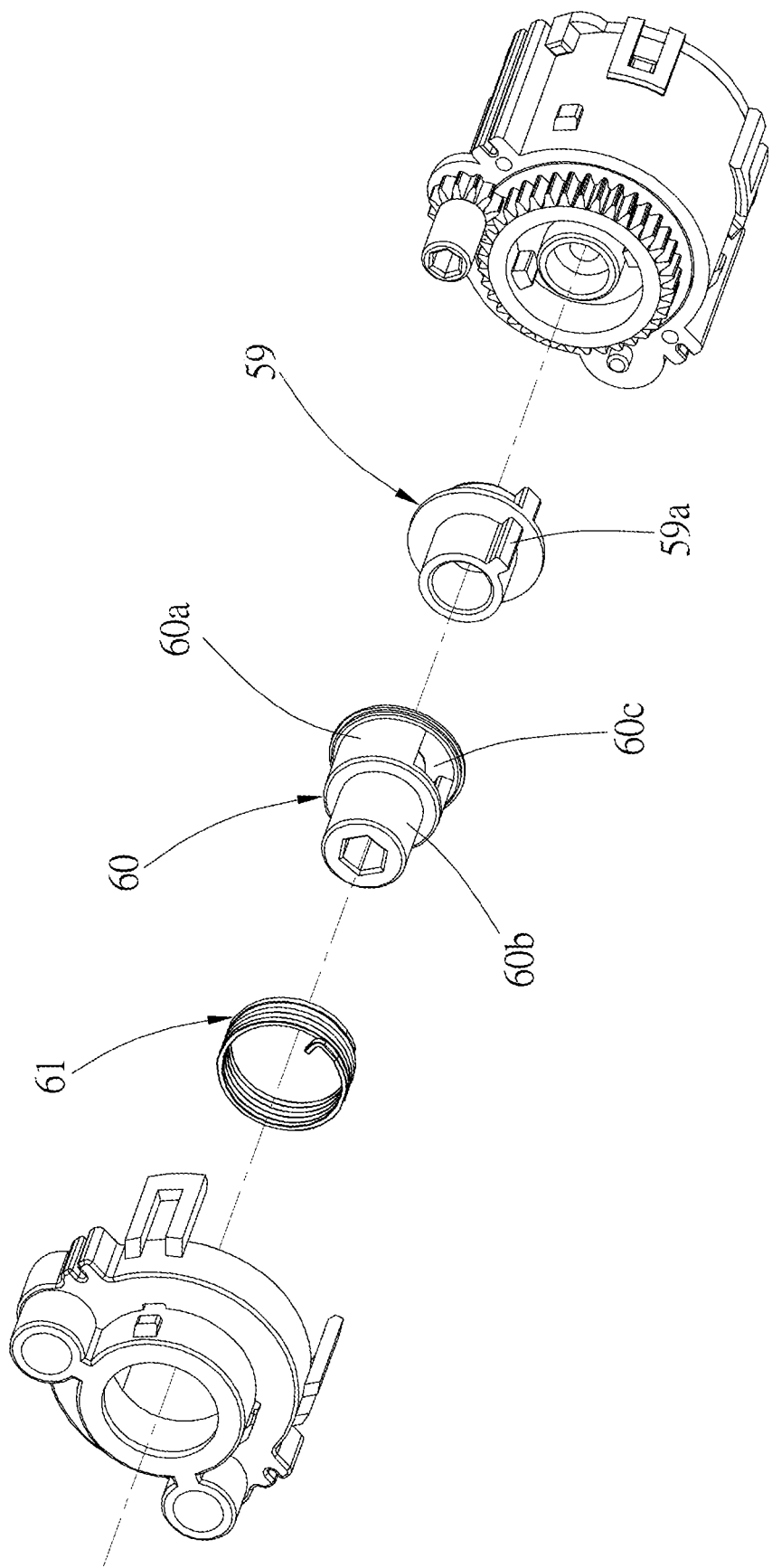
FIG. 31 is a exploded view of part of components in FIG. 30.
Figure 32:
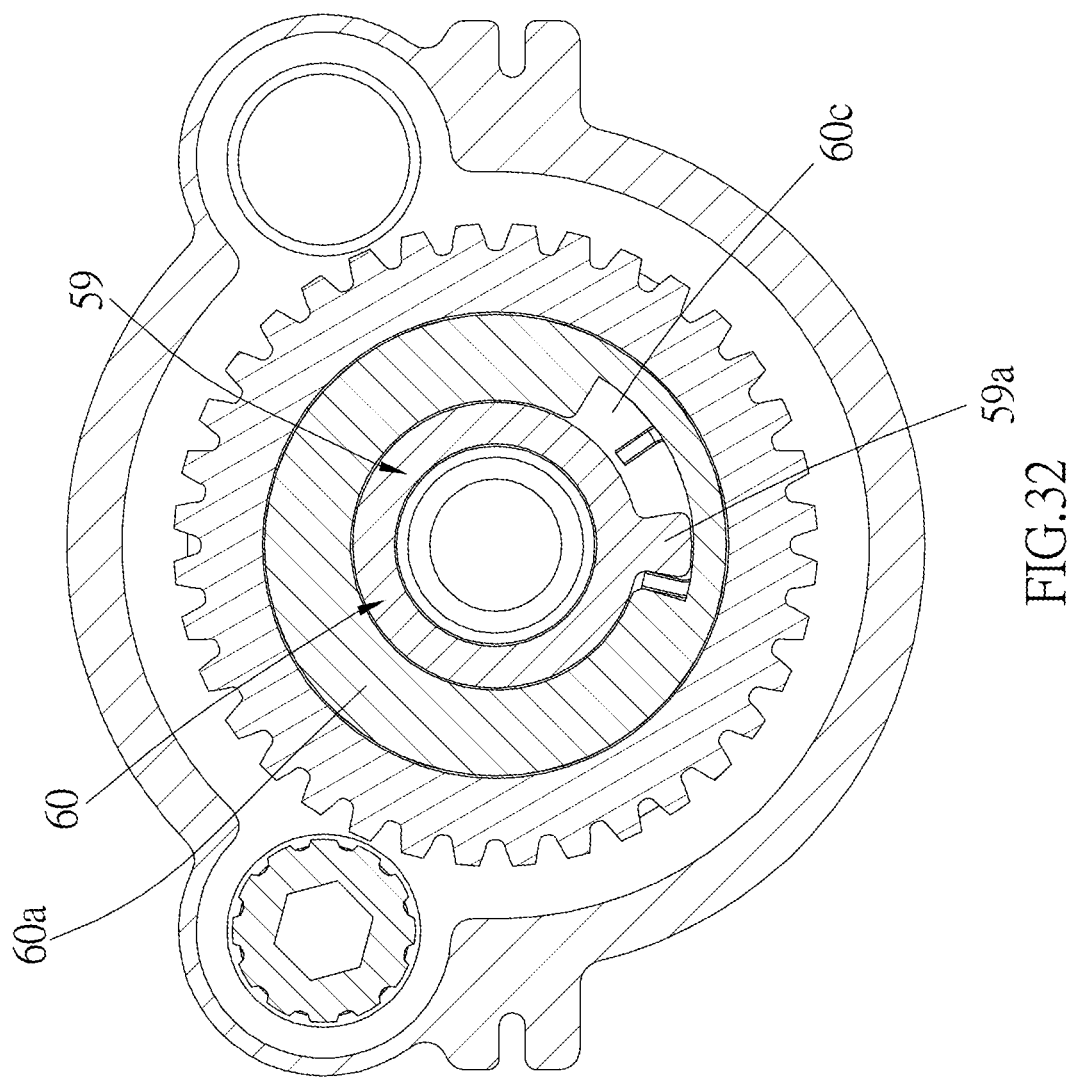
FIG. 32 is a sectional view along the 32-32 line in FIG. 30.

In each of the above embodiments, the lifting cords 13 are rolled up or released by controlling the pawls 46 to extend out of the driving shaft 43 for abutting against the second blocks 44*c* to drive the driven shaft 44, or by controlling the pawls 46 to retreat into the driving shaft 43 for allowing the covering material automatically droop and expand due to gravity. However, the pawls 46 and the driving shaft 43 can be omitted in practice. If this is the case, the structure of the output clutch mechanism should be adjusted. An output clutch mechanism of yet another embodiment is illustrated in FIG. 30 to FIG. 32, wherein an input end 59 and a driven shaft 60 are still remained. The input end 59 still interacts with the input mechanism, but the coupling slots with curved bottom are no longer provided. Instead, a push block 59*a* is projected in a radial direction of the input end 59. The driven shaft 60 remains a body 60*a* and an axle tube 60*b*, wherein the body 60*a* fits around the input end 59, and the driven shaft 60 has an opening 60*c* adapted to be inserted by the push block 59*a*. The axle tube 60*b* is connected to the second shaft 21. When the input end 59 is rotated in either one direction or another opposite direction as being driven by the input mechanism, the driven shaft 60 would be driven to rotate as well. Whereby, the lifting cords can be directly rolled up or released to collect or expand the window blind through the second spools 23. Said input mechanism could be controlled to collect or expand the window blind by pulling the cord loop 14, as mentioned in the above embodiments. Alternatively, the transmission member and the input end can be rotated in one direction or another by an electric motor. In such an embodiment, the transmission member is not the rotating wheel controlled by the cord loop 14, but is an output end of the electric motor instead. In addition, a second brake spring 61 fitting around the body 60*a* of the driven shaft 60 is able to stop the rotation of the driven shaft 60 by being expanded outward instantly, as mentioned in the previous embodiments, which could ensure that the covering material to stay at the current location.

It must be pointed out that the embodiments described above are only some preferred embodiments of the present disclosure. All equivalent structures which employ the concepts disclosed in this specification and the appended claims should fall within the scope of the present disclosure.

What is claimed is:
1. A window blind, comprising:
    a fixed rail;
    a plurality of slats, which are horizontally hanged below the fixed rail through at least one ladder tape, each of which has a front tape body and a rear tape body;
    an input mechanism adapted to control at least one lifting cord, so as to raise or lower the slats to collect or expand the window blind;
    an output adjustment mechanism provided in the fixed rail, wherein the output adjustment mechanism is adapted to operate with the input mechanism simultaneously;
    a first shaft provided in the fixed rail, wherein an end of the first shaft is connected to the output adjustment mechanism; the output adjustment mechanism is adapted to be driven by the input mechanism to rotate the first shaft, whereby to relative move the front tape body and the rear tape body of each of the at least one ladder tape in a vertical direction, changing the slats between a first state and a second state;
    a second shaft provided in the fixed rail, wherein, when the second shaft is driven by the input mechanism to roll up the at least one lifting cord to move a lowest slat among the slats toward the fixed rail, the slats are in the first state; when the second shaft is driven by the input mechanism to release the at least one lifting cord to move the lowest slat among the slats away from the fixed rail, the slats are in the second state; and
    an output clutch mechanism adapted to operate with the input mechanism simultaneously, wherein an end of the second shaft is connected to the output clutch mechanism; the output clutch mechanism comprises an input end, a driven shaft, and a one-way clutch provided between the input end and the driven shaft; the driven shaft is connected to an end of the second shaft; the input end is adapted to be driven by the input mechanism to rotate in a direction, which drives the one-way clutch to rotate the driven shaft, whereby the second shaft is driven to roll up the at least one lifting cords; the input end is also adapted to be driven by the input mechanism to rotate in another opposite direction, which disengages the one-way clutch from the driven shaft, whereby the second shaft is rotated relative to the input end of the output clutch mechanism.

2. The window blind of claim 1, wherein the input mechanism comprises a transmission member adapted to be rotated in a direction or in another opposite direction; the output adjustment mechanism comprises an adjustment output wheel and an adjustment driven wheel, wherein the first shaft is connected to the adjustment driven wheel; the adjustment output wheel is adapted to rotate along with the transmission member to rotate the adjustment driven wheel, whereby the adjustment driven wheel is adapted to drive the first shaft to rotate.

3. The window blind of claim 2, wherein the output adjustment mechanism comprises an adjustment clutch wheel and an adjustment clutch spring; the adjustment clutch spring has a main portion and two end legs connected to the main portion; the adjustment clutch wheel is adapted to be rotated by the transmission member, whereby one of the end legs of the adjustment clutch spring pushes against the adjustment output wheel to rotate.

4. The window blind of claim 3, wherein the output adjustment mechanism comprises a first case and a transmission wheel; the adjustment output wheel, the adjustment driven wheel, the transmission wheel, the adjustment clutch wheel, and the adjustment clutch spring are provided in the first case; the first case has a stopper provided therein, the stopper is fixed relative to the first case; the adjustment output wheel has a notch; the transmission wheel is provided in the adjustment output wheel; the transmission wheel has a first block received in the notch, and a pushing portion located between the end legs of the adjustment clutch spring; when the transmission member of the input mechanism is rotated, one of the end legs of the adjustment clutch spring pushes against the pushing portion, so that the first block rotates the adjustment output wheel to drive the at least one ladder tape, changing the slats between the first state and the second state; when the slats are in the first state or in the second state, and the transmission member is continuously rotated in a same direction, the other one of the end legs of the adjustment clutch spring abuts against the stopper, and a distance between the end legs of the adjustment clutch spring changes, whereby the adjustment clutch wheel is rotatable relative to the main portion of the adjustment clutch spring and the adjustment output wheel.

5. The window blind of claim 4, wherein the adjustment output wheel comprises a first half portion and a second half portion; the first half portion has a toothed segment provided on a surface thereof, and the notch is provided at the second half portion; an end of the adjustment driven wheel is connected to the first shaft, and a gear is provided on another end thereof, wherein the gear meshes with the toothed segment of the adjustment output wheel.

6. The window blind of claim 5, wherein the output adjustment mechanism comprises a first brake spring fitting around the second half portion of the adjustment output wheel; the first brake spring is adapted to restrict the first shaft from rotating when the first shaft is rotated in a reversed direction.

7. The window blind of claim 3, further comprising a stroke delay mechanism adapted to rotate the second shaft after the adjustment clutch wheel is rotated for a distance.

8. The window blind of claim 7, wherein the stroke delay mechanism comprises an initial push block and a final push block; the initial push block is provided corresponding to the adjustment clutch wheel, and is adapted to operate with the adjustment clutch wheel simultaneously; the final push block is provided corresponding to the second shaft, and is adapted to operate with the second shaft simultaneously; the adjustment clutch wheel is adapted to be rotated to move the initial push block, and the final push block is pushed to drive the second shaft after the initial push block is moved for a distance.

9. The window blind of claim 8, wherein the stroke delay mechanism further comprises at least one intermediate wheel located between the initial push block and the final push block, wherein the at least one intermediate wheel is adapted to be pushed and rotated by the initial push block, and is adapted to push the final push block after rotating for a distance.

10. The window blind of claim 1, wherein the output clutch mechanism comprises a driving shaft; the driving shaft is hollow, and fits around the input end; the driving shaft has at least one opening communicating with a hollow portion thereof; the driven shaft has a body fitting around the driving shaft, wherein the body has at least one second block provided on an inner wall thereof; the one-way clutch comprises at least one pawl, which is pivotally provided at the input end with an end of the at least one pawl, while another end thereof extends into one of the at least one opening; when the slats are in the first state, and when the input mechanism rotates the input end to urge the slats to rotate toward the first state, the another end of each of the at least one pawl passes through the opening to abut against one of the at least one second block, and pushes the driven shaft to rotate; or when the input mechanism rotates the input end to urge the slats toward the second state, the at least one pawl retreats into the at least one opening without abutting against the at least one second block, so that the second shaft drives the driven shaft to rotate on free relative to the input end.

11. The window blind of claim 10, wherein the driving shaft has a notch on an end thereof; the input end has a third block provided thereon, wherein the third block is located in the notch to abut against one of two walls of the notch.

12. The window blind of claim 11, wherein the output clutch mechanism further comprises a second brake spring fitting around the driving shaft; an end of the second brake spring extends into the notch; when the second shaft is rotated in a reversed direction, one of the walls of the notch pushes the end of the second brake spring extending into the notch, whereby the second brake spring restricts the driving shaft from rotating.

13. The window blind of claim 1, further comprising a stroke delay mechanism adapted to rotate the second shaft through the input end after the adjustment clutch wheel is rotated for a distance.

14. The window blind of claim 13, wherein the stroke delay mechanism comprises an initial push block and a final push block; the initial push block is provided corresponding to the adjustment clutch wheel, and is adapted to operate with the adjustment clutch wheel simultaneously; the final push block is provided corresponding to the input end, and is adapted to operate with the input end simultaneously; the adjustment clutch wheel is adapted to be rotated to move the initial push block, and after the initial push block is moved for a distance, the initial push block pushes the final push block to drive the input end, which rotates the second shaft.

15. The window blind of claim 14, wherein the stroke delay mechanism further comprises at least one intermediate wheel located between the adjustment clutch wheel and the input end, wherein the at least one intermediate wheel is adapted to be pushed and rotated by the initial push block, and is adapted to push the final push block after rotating for a distance.

16. The window blind of claim 4, wherein the first case comprises a front tube, a middle tube, a rear tube, and an end cap; the front tube and the end cap are respectively engaged with two opposite ends of the middle tube; the rear tube is provided in the middle tube in a non-rotatable manner; the adjustment output wheel, the adjustment driven wheel, the transmission wheel, the adjustment clutch wheel, and the adjustment clutch spring are located between the front tube and the rear tube; the stopper is provided corresponding to an inner wall of the rear tube.

17. The window blind of claim 3, wherein the input mechanism comprises a deceleration unit; the deceleration unit has input end and an output end; the input end of the deceleration unit is connected to the transmission member, and the output end thereof is connected to the adjustment clutch wheel.

18. The window blind of claim 1, wherein a top end of one of the front tape body and the rear tape body of each of the at least one ladder tape is fixedly provided relative to the fixed rail.

19. The window blind of claim 18, wherein the slats are long slats made of a flexible material; one of the first state and the second state refers to a first condition when the slats are expanded, wherein the front tape body of each of the at least one ladder tape is moved downward relative to the rear tape body of the corresponding ladder tape at the first condition; the other one of the first state and the second state refers to a second condition when the slats are rolled up, wherein the front tape body of each of the at least one ladder tape is moved upward relative to the rear tape body of the corresponding ladder tape at the second.

20. The window blind of claim 1, wherein the slats are long slats made of a rigid material; one of the first state and the second state refers to a first condition when a lateral edge of each of the slats corresponding to the front tape body is lower than another lateral edge thereof corresponding to the rear tape body, and the lateral edge of one of the slats corresponding to the front tape body is lower than the another lateral edge of the adjacent one of the slats corresponding to the rear tape body, wherein the front tape body of each of the at least one ladder tape is moved downward relative to the rear tape body of the corresponding ladder tape at the first condition; the other one of the first state and the second state refers to a second condition when the lateral edge of each of the slats corresponding to the front tape body is higher than the another lateral edge thereof corresponding to the rear tape body, and the lateral edge of one of the slats corresponding to the front tape body is higher than the another lateral edge of the adjacent one of the slats corresponding to the rear tape body, wherein the front tape body of each of the at least one ladder tape is moved upward relative to the rear tape body of the corresponding ladder tape at the second condition.

* * * * *